United States Patent [19]
Borgatti et al.

[11] Patent Number: 5,068,775
[45] Date of Patent: Nov. 26, 1991

[54] HIGH DYNAMIC PERFORMANCE DC-DC CONVERTER SYSTEM WITH TIME SHARE CONTROL

[75] Inventors: Riccardo Borgatti, Bollate; Paolo Tenti, Padova, both of Italy

[73] Assignee: Fiar Fabbricia Italiana Apparecchiature Radioelettriche S.p.A., Milan, Italy

[21] Appl. No.: 485,018

[22] Filed: Feb. 26, 1990

[30] Foreign Application Priority Data

Mar. 3, 1989 [IT]  Italy .............................. 19656 A/89

[51] Int. Cl.$^5$ ........................................... H02M 3/335
[52] U.S. Cl. ......................................... 363/15; 363/95; 363/97
[58] Field of Search ......................... 363/15, 16, 17, 95, 363/97, 98

[56] References Cited

U.S. PATENT DOCUMENTS

| | | | |
|---|---|---|---|
| 4,307,441 | 12/1981 | Bello | 363/97 |
| 4,322,817 | 3/1982 | Kuster | 363/26 |
| 4,456,872 | 6/1984 | Froeschle | 363/21 |
| 4,873,408 | 10/1989 | Smith et al. | 363/98 |
| 4,885,674 | 12/1989 | Varga et al. | 363/97 |

*Primary Examiner*—Steven L. Stephan
*Assistant Examiner*—J. Sterrett
*Attorney, Agent, or Firm*—Guido Modiano; Albert Josif

[57] ABSTRACT

A high dynamic performance, DC-DC converter system with time sharing control is described, comprising at least one main control circuit loop for a direct output voltage and at least one further circuit loop for a direct output average current which is internal to the main control loop, the voltage and current loops acting onto two autonomous circuit loops having first order transfer functions.

7 Claims, 14 Drawing Sheets

HIGH DYNAMIC PERFORMANCE DC-DC CONVERTER SYSTEM WITH TIME SHARE CONTROL

BACKGROUND OF THE INVENTION

The present invention regards a high dynamic performance, DC-DC converter system with time share control.

As is known, conventional DC-DC converters generally perform output voltage control by directly acting on the so-called duty-cycle on which this same voltage depends.

In this direct output voltage control, in particular, an error quantity acts on a system having a second order transfer function, with consequent considerable difficulties in implementing a voltage controller which is able to assure a good compromise between response readiness and system stability.

SUMMARY OF THE INVENTION

The aim of the present invention is indeed to eliminate at least the above mentioned drawback by devising a DC-DC converter system wherein, instead of using an error quantity resulting from the difference between a reference and the actual value, for acting on the duty-cycle, this quantity is exploited to control, besides of the output voltage, also the average output current, so as to vary the converter system dynamic range and to considerably simplify its structure.

Within this aim, the main object of the present invention is to provide a DC-DC converter system which has a high operative stability and at the same time a good response speed.

Another object of the present invention is to provide a DC-DC converter system which, in case of control signal changes which require a considerable current increase in the filter inductor, is able to respond with a delay which depends, besides on the state of this inductor, also on the amplitude and sign of the input signal and on the value of L.

Another object of the present invention is to provide a DC-DC converter system including control means intended to respond to high changes of the control signal with a maximum delay equal to the time length of a clock cycle.

Another object of the present invention is to provide a DC-DC converter system which has a highly reliable operation, both with the voltage across the primary winding of the transformer being lower than the power supply (so called "BUCK" operation) and with the voltage across the primary of the transformer being higher than the power supply (so called "BOOST" operation) and wherein, in particular, the change between this two operating modes is automatic and does not cause the boundary therebetween to present any type of discontinuity.

Another object of the present invention is to provide a DC-DC converter system having a wide voltage range, at the same time avoiding any potentials downstream of the inductor which are dangerous for the switch means of the rectifier circuit.

Not least object of the present invention is to provide a DC-DC converter system which, in controlling the direct output voltage, presents high response to large signals.

The above aim and objects, as well as other objects which will become more apparent hereinafter, are achieved by a DC-DC converter system as defined in claim 1.

BRIEF DESCRIPTION OF THE DRAWINGS

The features and advantages of the high dynamic performance, DC-DC converter system with time sharing control according to the present invention will become more apparent from the following detailed description of a currently preferred embodiment which is shown only by way of non-limitative example in the accompanying drawings, wherein.

DESCRIPTION OF THE PREFERRED EMBODIMENTS

With reference to the above figures, a currently preferred embodiment of the DC converter according to the teaching of the present invention will be now described.

Figure 1:
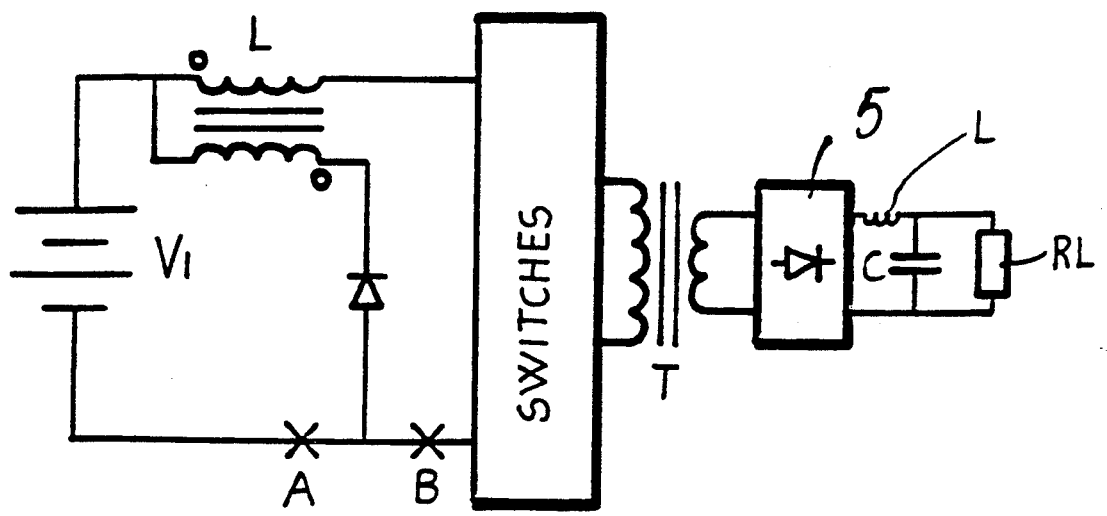
FIG. 1 is a principle circuit diagram of a known converter, partially modified according to the teaching of the invention.

With reference to the basic structure of the Weinberg converter, schematically shown in FIG. 1, two links of the loop are visible which are more suitable to allow taking up of the quantity which is intended to be controlled (in this case an output current provided by rectifier means to a load impedance RL through a conventional filter inductance L and a filter capacitor C).

In particular, by using the current which is available on the link "A" as a return signal for the feedback loop, the current fed from the power supply, e.g. the power fed to the load is controlled, while in the case of the link "B" the current fed to the load is controlled (still under the assumption of ideal transformer).

As will be noted, in order that the transfer function of the voltage loop becomes very simple, it is convenient that the solution "B" is used, thus obtaining a control of the actual average current flowing through "L" and therefore of the average current fed to the load.

Figure 2:
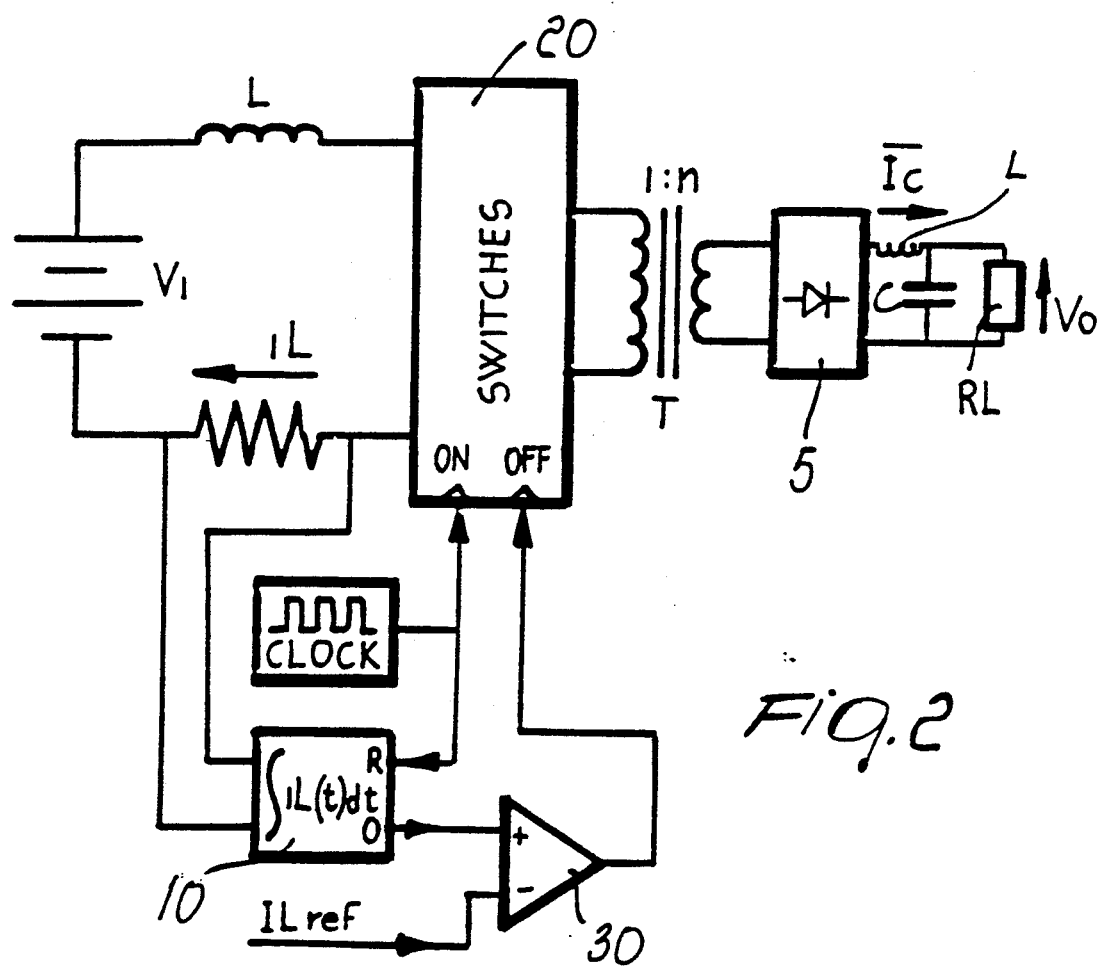
FIG. 2 is a principle block diagram of a possible system for controlling the average current fed to the load for the circuit of FIG. 1.

Neglecting now the problems related to the practical implementation of the system, a principle circuit suitable for this aim is shown in FIG. 2.

At each cycle, the charge supplied to the load through an integrator is calculated. Since the clock cycle is as an hypothesis constant, the output voltage of the integrator 10 is proportional to the average value of "iL". An on-off circuit 20 causes interruption of "iL" when the integral of the current is equal to the imposed reference value (iLref).

If the comparator 30, and the switches are sufficiently quick with respect to the times at issue (in particular with respect to the clock cycle), the current loop is inherently stable.

Let's see the value of the ratio:

$$Vo(s)/IL(s)$$

that is the transfer function of a system such as the one just described.

If the input signal is assumed to be "almost periodic" with a direct component which is slowly changing with respect to the clock cycle, in a first approximation the ripple caused by the alternate components may be neglected.

Therefore, as to the only average instantaneous value of "iL" [IL(t)], we have $$CdVo(t)/dt + Vo(t)/R_L = IL(t)/n$$

(wherein Vo is the direct voltage on the load $R_L$, IL(t) is the current in the primary winding of the transformer T and IL(t)/n is the current flowing through the diode 5) which L-transformed gives:

$$sCVo(s) + Vo(s)/R_L = IL(s)/n$$

and thus $$Vo(s)/ILref(s) = R_L/[n(1+sR_LC)] \quad (3.1.1)$$

Moreover, since IL(s) = ILref(s), lastly we have:

$$Vo(s)/ILref(s) = R_L/[n(1+sR_LC)] \quad (3.1.2)$$

Figure 3:
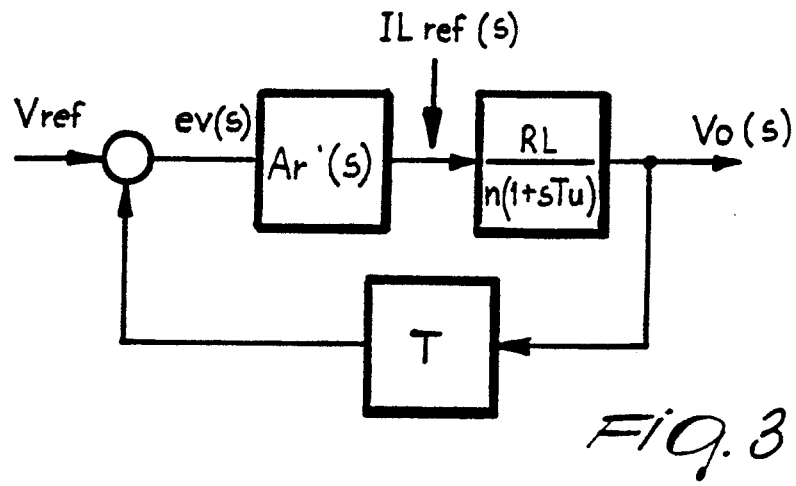
FIG. 3 is a block diagram of the voltage loop.

The block diagram of FIG. 3 shows the loop for the output voltage control. Therein the current loop has been intentionally omitted, since the latter is represented by a block the transfer function whereof is as a hypothesis unitary.

By supposing Ar'(s) linear, the block diagram of FIG. 3 can be indifferently usable for analyzing the system behavior with small or large signals.

Stability is ensured when Ar'(s) is a controller both of the simple P-type (Proportional type) and of the PI (Proportional-Integral) type. The expression of the transfer function of the loop gain in the first case shows that the single pole is the one caused by the time constant of the load, while if Ar'(s) coincides with the response of a PI, this pole will sum to the pair "nihil pole-zero" which is typical of this controller.

It is evident that, in both cases, the phase of the point at which the harmonic response modulus crosses the frequency axis is lower than "û", independently from the position of the pole and the zero. The positive phase margin ensures the system stability.

Hereinbelow the use of the current source, controlled by a voltage loop, will be described in greater detail, and the dynamic range of the loop will be characterized through its output impedance.

Before beginning however it is important to specify the dynamic features of the current control loop shown in FIG. 2. This circuit does not in fact correctly perform its task when the control signal "ILref" undergoes large fluctuations. The reason thereby is that the inductor instantaneous current, not being controlled at all, is a function of the operating point of the converter. Therefore when the fluctuation in the control signal are such as to require a consistent amount of the inductor current, since the fluctuation of "iL" are subject to the typical inertia of inductive elements, the circuit will respond with a delay which depends from the amplitude and sign of the control signal and on the value of L, besides of the state of the circuit itself.

In the following this problem will be solved by providing a control system which is able to respond to the large stresses of the control signal with a maximum delay equal to a clock cycle.

Under this premise, let's turn back to the converter block diagram, dwelling on the power section of the direct loop.

Ai indicates the transfer function representing the ratio of the output average current to the voltage at the current loop control input.

The variation of Vo resulting from small changes of $R_L$ is:

$$dVo(s) = Vo(s)\frac{Ai}{n}\frac{dRL}{(1+sR_LC)^2}$$

and being $$Vo(s)\, Ai/n = Io(s)$$

it results:

$$dVo(s)/dR_L = Io(s)/(1-sTu)^2 \quad (3.2.1)$$

In this situation, the output impedance is the one measured across a bipole supplied by a current source, that is:

$$Zo(s) = 1/sC \quad (3.2.2)$$

Figure 5:
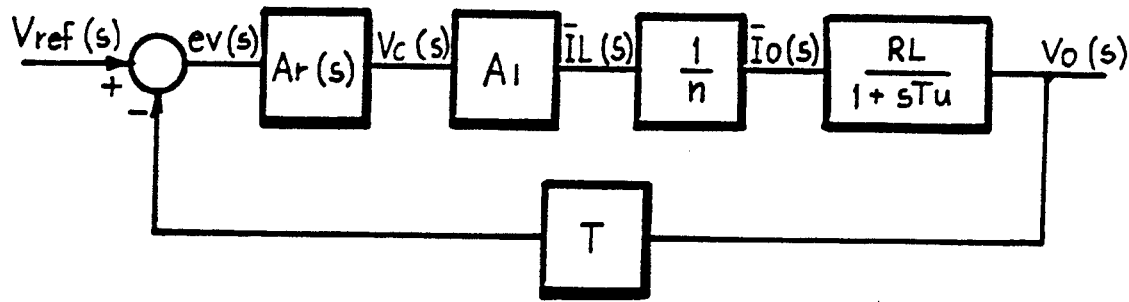
FIG. 5 is a final block diagram of the voltage loop.

By employing an adapted controller and closing the voltage loop, the diagram of FIG. 5 is obtained.

Figure 6:
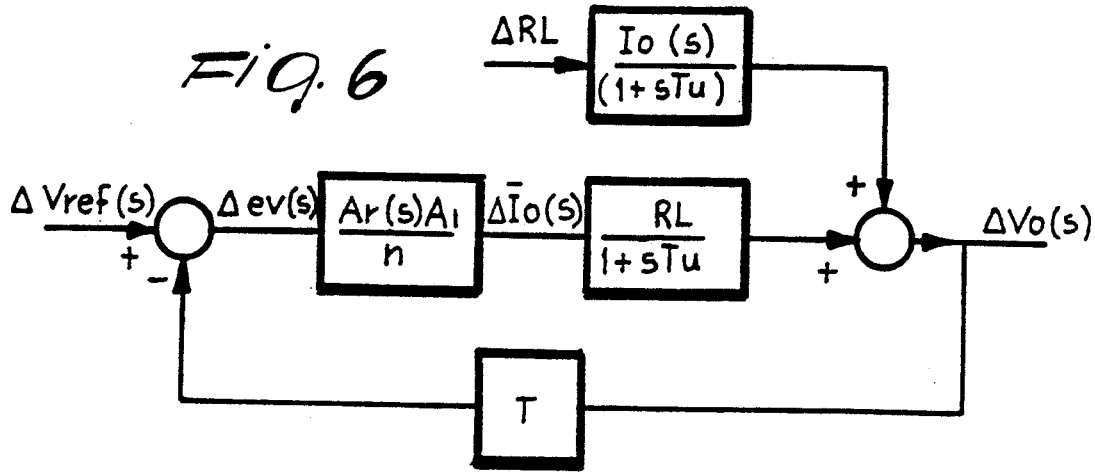
FIG. 6 is a diagram of a voltage loop with contribution due to a change in the load resistance.

At last, by introducing the effect on the output caused by "dRL" and expressed by (3.2.1), the diagram of FIG. 6 is obtained.

Figure 4:
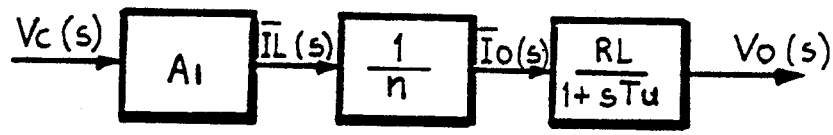
FIG. 4 is a block diagram of the current converter and of the load.

The circuit of FIG. 6 is in practice obtained by linearizing the transfer function shown in FIG. 4 as regards variations of Vo(s) and $R_L$.

The approach which has been followed up to now slightly differs from the previous one as regards the computation of Zo(s), wherein the system had been linearized before performing the Laplace transform.

From FIG. 6 it follows immediately:

$$\frac{dV_o(s)}{dR_L} = \frac{\frac{I_o(s)}{(1+sTu)^2}}{1 + \frac{A_r(s)A_i R_L T}{n(1+sTu)}} \quad (3.2.3)$$

The output impedance with closed loop can be obtained operating on the output bipole:

$$V_o(s) = -IR(s)R_L$$

$$dV_o(s) = -IR(s)dR_L - R_L dIR(s)$$

and thus $$Z_o(s) = \frac{dV_o(s)}{dIR(s)} = \frac{1}{\frac{IR(s)}{R_L}\frac{dR_L}{dV_o(s)}\frac{1}{R_L}}$$

and taking into account that $$IR(s) = I_c(s) - I_o(s) \rightarrow IR(s) = -I_o(s)/(1+sTu)$$

by replacing this last equation and the (3.2.3) one in the expression of Zo(s), the final expression of Zo(s) is obtained:

$$Z_o(s) = \frac{1}{sC + \frac{A_r(s)A_i T}{n}} \quad (3.2.4)$$

Control of the average current in "L" has thus brought to considerably simplify the structure of the output voltage control loop.

In essence, the direct chain dynamic range, excluding the controller, reduces to a single pole which is variable as a function of the load resistance (still in the hypothesis that the current source pole is at such frequencies so as to be neglectable).

The synthesis of the voltage controller does not now pose particular problems. The choice may fall on the P or the PI or still the PID (Proportional+Integral+Derivative) type. The system is anyhow stabile. As seen, this conclusion may be immediately drawn by evaluating the possible transfer functions which the system loop gain may assume. Independently from the function performed by the controller, a positive phase margin is anyhow obtained. It is obvious that, when any pole of the current source cannot be neglected (e.g. when it is required that the entire system dynamic range is particularly high and thus becomes comparable with the one of the controlled current source), the system may be stabilized only if the gain is appropriately selected and the zero(s) is (are) conveniently located.

If a null static error is desired, it is obvious that the controller choice should be directed to the PI or the PID type.

This latter contributes to the improvement of the system response to high frequencies both as to response readiness to modifications of Vref and as to maintenance of a low value of Zo(s). While the response speed to Vref does not involve substantial problems since this quantity is constant or slowly variable, a low value of Zo is usually well desirable during design.

Let's assume to adopt a PI-type controller, for which:

$$A_r(s) = A_o(1+sTr)/s$$

the loop gain is:

$$GH = \frac{A_o A_i R_L T}{n} \frac{1+sTr}{s(1+sTu)} \quad (3.3.1)$$

Figure 7:
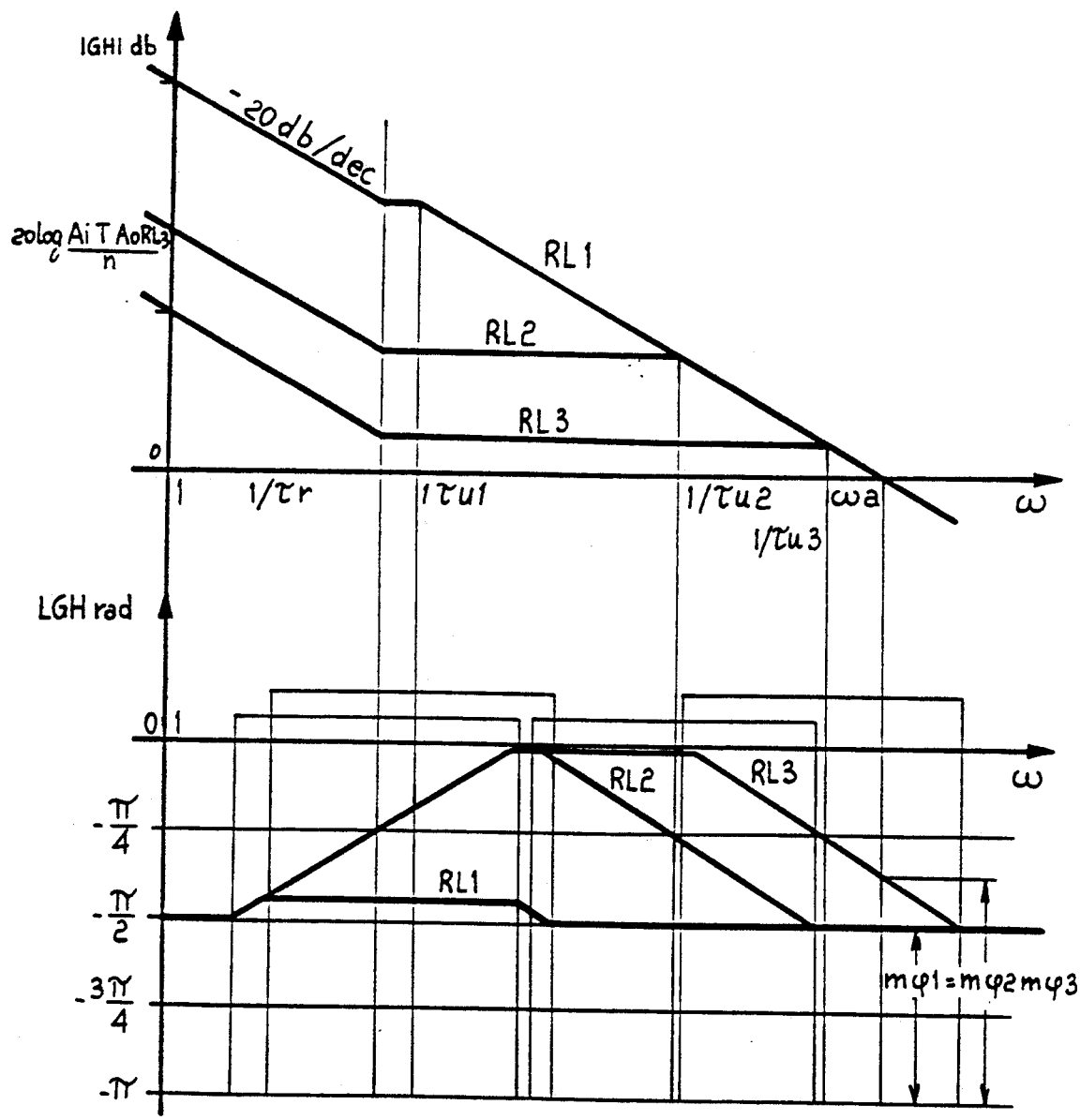
FIG. 7 is a plot showing the behavior of the loop gain when the load resistance varies for a controller of the PI type.

FIG. 7 shows the module and phase asymptotic diagram, in the hypothesis that Tr>Tu.

Obviously the system is stable. The phase margin varies as a function of the load, but the system readiness does not vary. This feature can be immediately verified by remembering the hyperbolic relation which links the bandpass and the response speed and by assuming that the system cutoff frequency coincides with the intersection between |GH| and the frequency axis. It will be noted that this point does not vary with the load (at least within limits).

From FIG. 7 it can be further deduced that even with Tu>Tr the intersection frequency remains unchanged.

As a general rule, if poles and zeros are on the left of Wa, that is if:

$$Wa >> 1/Tu \text{ and } Wa >> 1/Tr$$

with a good approximation, the following may be assumed to be valid:

$$Wa = \frac{A_o A_i R_L T}{n} \frac{Tr}{Tu} \quad (3.3.2)$$

For calculating Zo(s), it is sufficient to replace the expression of the PI-controller transfer function in (3.2.4). With simple calculations, the following is obtained:

$$Z_o(s) = \frac{1}{C} \frac{s}{s^2 + \frac{sKTr}{C} + \frac{K}{C}} \quad (3.3.3)$$

with $K = A_o A_i T/n$ and by defining: $W_o = (K/C)^{\frac{1}{2}}$ and $\hat{u} = W_o Tr/2$ the canonic form of second order systems is obtained, of the type:

$$Z_o(s) = \frac{1}{C} \frac{s}{s^2 + s2\hat{u}W_o + W_o^2} \quad (3.3.4)$$

Thereby any pair "Wo", "û" may be obtained by selecting suitable values for the controller parameters.

In particular, as to the module of Zo(s), the following is valid:

$$|Z_o(s)| = \frac{W}{C[(2W\hat{u}W_o)^2 + (W_o^2 - W^2)^2]^{\frac{1}{2}}} \quad (3.3.5)$$

the poles of Zo(s) are real and distinct for "û>1", in which case the following is obtained:

$$S_1 = -W_o[\hat{u} - (\hat{u}^2 - 1)^{\frac{1}{2}}]$$

$$S_2 = -W_o[\hat{u} + (\hat{u}^2 - 1)^{\frac{1}{2}}]$$

The maximum value of |Zo(s)| is obtained at W=Wo, since the latter is the only root which satisfies the equation:

$$d|Z_o(w)|/dw = 0$$

and its value is $$|Zo|_{max} = |Zo(Wo)| = 1/(2 \hat{u} Wo) \quad (3.3.6)$$

by substituting the values of Wo and û, the following is obtained:

$$|Zo|_{max} = n/(Ao \, Ai \, TTr) \quad (3.3.7)$$

Therefore in the case of a PI-controller, the maximum value of $|Zo|$ is obtained at $W=Wo$, which is independent from the value of "û". High values of "û" cause a quite flat plot of $|Zo(W)|$ since the roots of the polynomial move away from Wo, as "û" increases. On the contrary, small values of "û" cause a reduction of the range within which $|Zo(W)|$ remains practically constant. In particular, if $\hat{u} \to 0$, when $W=Wo$ $|Zo(W)| \to \infty$.

Figure 8:
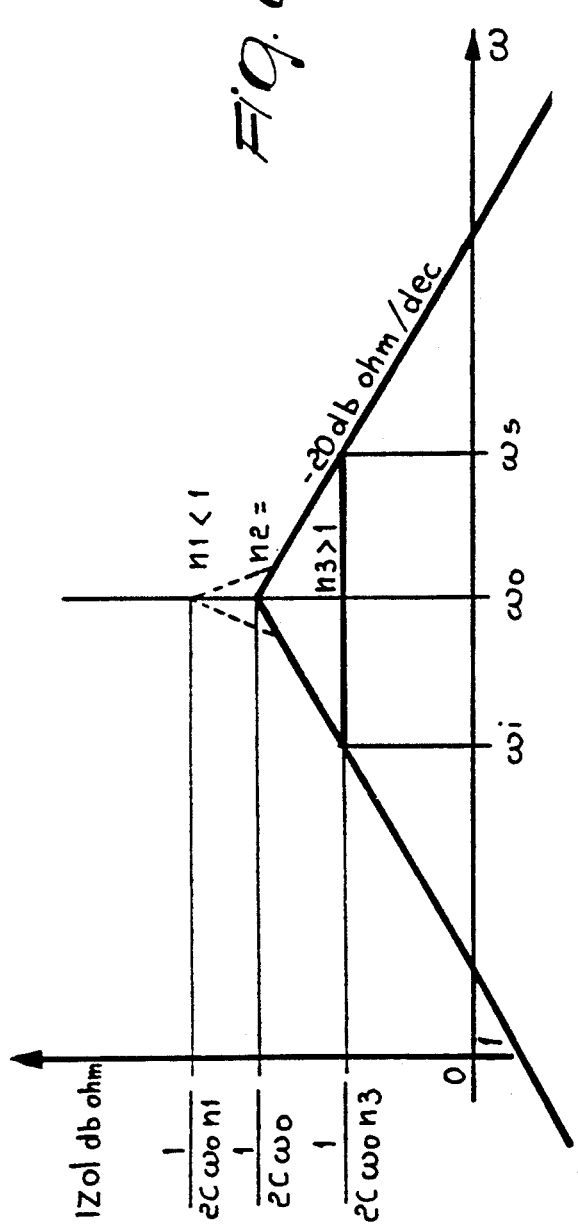
FIG. 8 is an asymptotic diagram of the output impedance for the mentioned PI-type controller.

FIG. 8 schematically shows the behavior of $|Zo(W)|$ for three typical values of the decay coefficient.

In particular, it will be noted as the upper and lower cutoff frequencies are directly obtained by the intersection between the asymptotic diagram with $\hat{u}=1$ and the horizontal straight line representing the maximum value of $|Zo(W)|$ as a function of "û".

Figure 9A:
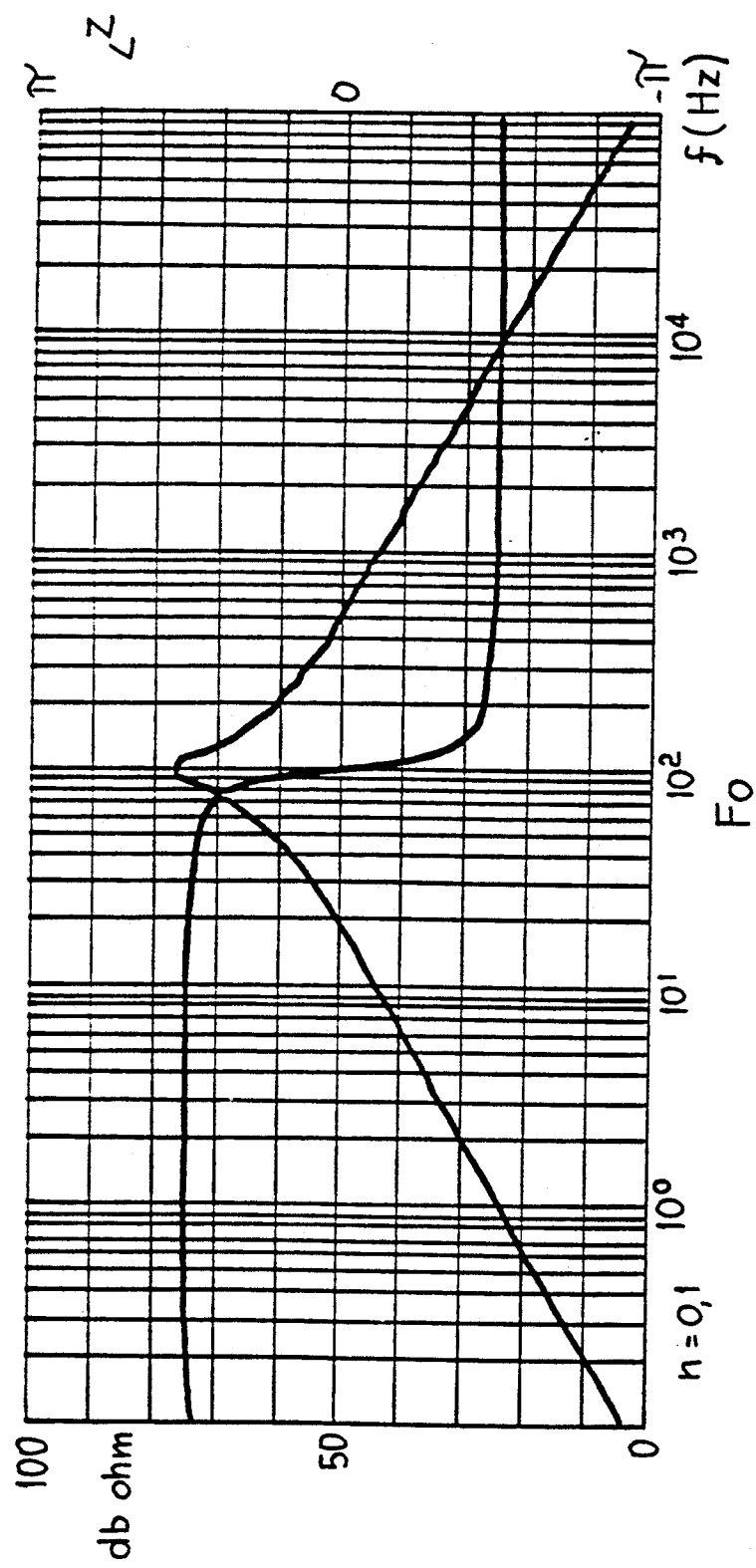
FIGS. 9A, 9B, 9C are Bode diagrams showing the real behavior of modulus and phase of the output impedance of the PI controller.
Figure 9B:
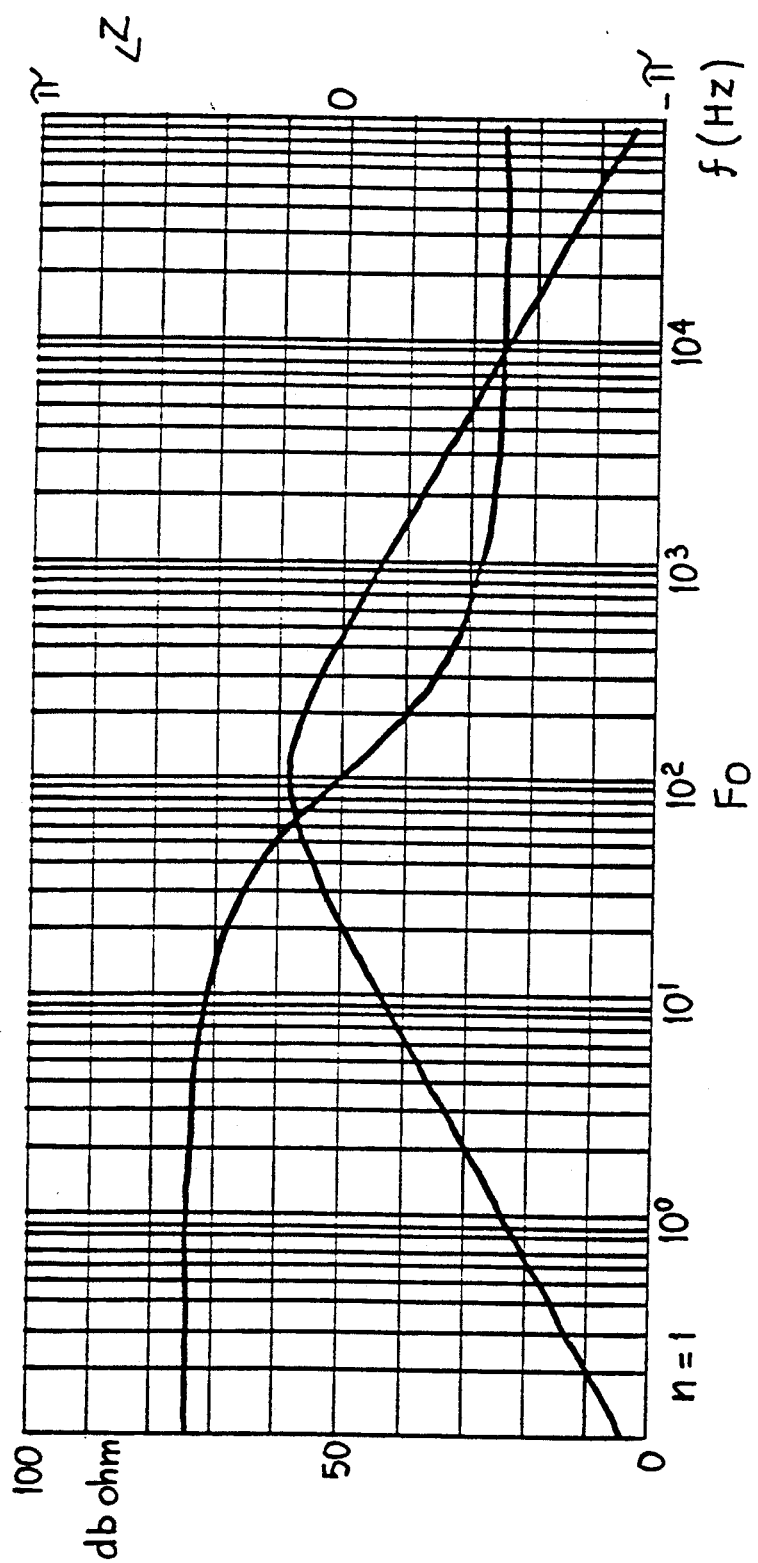
Figure 9C:
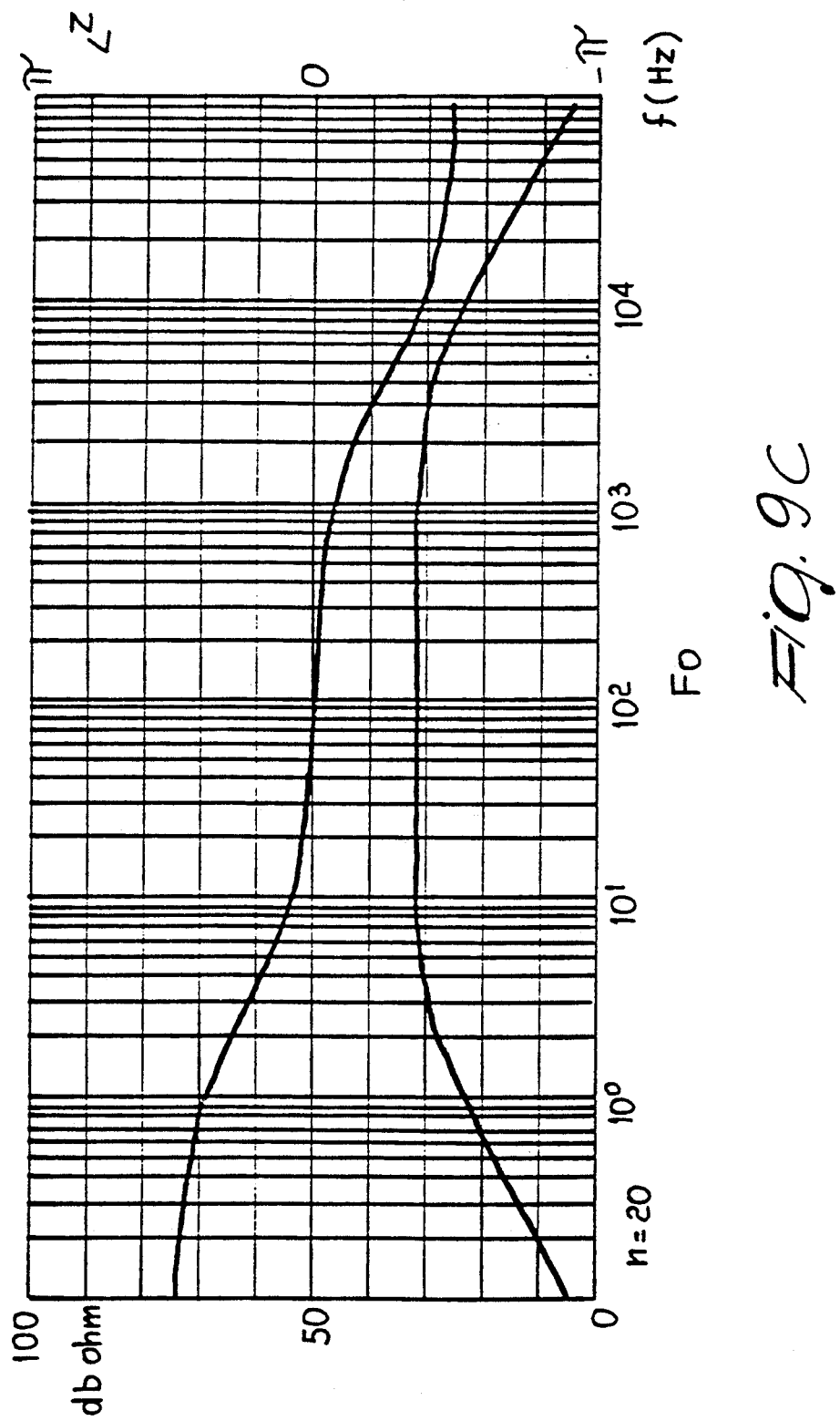

The Bode diagram of FIGS. 9A, 9B, 9C shows the actual module and phase behavior of the output impedance, when:

$$C = 10^{-6} F \text{ and}$$

$$Wo = 628 \, s^{-1} \, (fo = 100 \, Hz)$$

for three different values of "û" (û=0.1, û=1, û=20).

A last observation regards the behavior of $|Zo(w)|$ as C varies.

Figure 10:
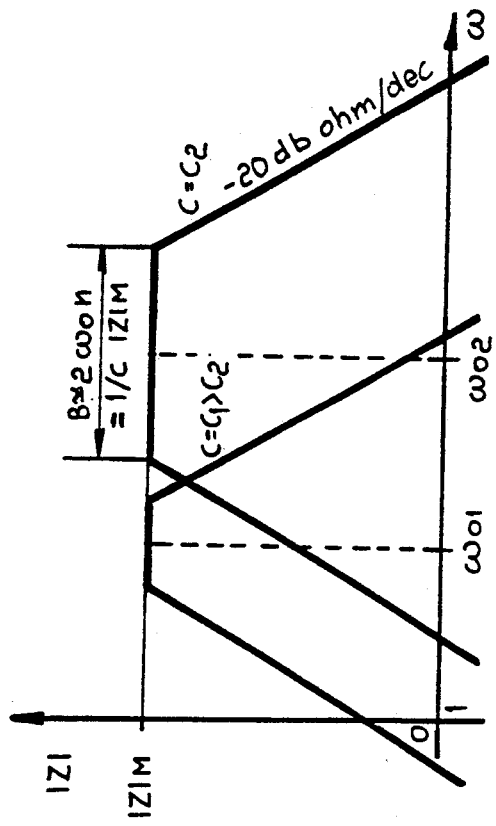
FIG. 10 is a further diagram which is useful to understand the operation of this controller.

First of all from (3.3.7) it results that the maximum value of $|Zo|$ does not depend on C. In particular, an increase of C causes a reduction of "Wo" and "û" (FIG. 10).

With û>1, the bandpass of $|Zo(w)|$ (which is intended with the same sense used for the transfer functions) is:

$$B = Wo[\hat{u} + (\hat{u}^2 - 1)^{\frac{1}{2}}] - Wo[\hat{u} - (\hat{u}^2 - 1)^{\frac{1}{2}}]$$

$$B = 2Wo(\hat{u}^2 - 1)^{\frac{1}{2}}$$

and if û >> 1

$$\to B \approx 2 \hat{u} Wo \quad (3.3.8)$$

By replacing the (3.3.8) in the (3.3.6), it follows:

$$|Zo(s)|_{max} B = 1/C \quad (3.3.9)$$

Therefore, for û >> 1, the product between the bandpass and the maximum impedance is constant and is equal to 1/C (of course, in the hypothesis of a PI controller).

The Bode diagram of FIGS. 9A, 9B, 9C also points out the nature of the output impendance: reactive inductive at low frequencies and capacitive at high frequencies.

The higher is "û", the wider is the frequency range within which Zo(W) has a resistive nature and practically constant value.

All the relations between (3.3.1) and (3.3.9) are particularly useful for the synthesis of the PI controller, assuming that the specification regarding the plot of "Zo" have been given.

As a confirmation thereof, let's suppose that only the system impedance band is to be reduced, while $|Zo|$ max and Wo are unchanged. From (3.3.9), the new value of C may be calculated (which is higher in this case). From the expression of Wo the static gain of the controller and from the (3.3.8) the decay coefficient in the new conditions are obtained. As a last step, from "û" "Tr" is deduced.

Heretofore, the current control principle has been introduced and the possible structure has been analyzed.

Let's turn back to the suspended matter, proposing a possible implementation of the current loop and analysing its functioning.

As already seen, the main drawback of the circuit shown in FIG. 2 is the low response speed to large signals. In fact, since the current in "L" is not controlled, if for any reason such current is small, the circuit is not able to compensate "instantaneously" (from now on thereby "within a clock period" is intended) an abrupt increase in the required current.

In the proposed schema, the duty-cycle in the steady-state exclusively depends on the output voltage (with continuous conduction) and the average current in "L", during the conduction interval "dT" on the current which is required by the load.

By then defining a functioning interval "d" and naming "ILr" the average current in "L" during the interval "d", the average current supplied to the load is equal to:

$$IL = ILrd \quad (4.1.1)$$

If "L" is supposed to be sufficiently high, the maximum average current which may be supplied in the following period is:

$$ILmax \approx ILr$$

with a maximum change of $$vIL \approx ILr(1-d)$$

The circuit according to FIG. 2 function in a correct way only if "dILref", that is the required current change, maintains lower than the just calculated variation. This last value is at most equal to "ILr" which, as seen, may be very small.

In order to avoid this drawback, an auxiliary logics may be provided which is able to control the current flowing through "L" and to maintain it close to a preset value in any operation conditions. Thereby an "instantaneous" response is ensured to any input signal the amplitude whereof is lower than preset thresholds.

By now naming "ILr" the current through "L" which is assured by the auxiliary logics and defining a maximum conduction interval equal to "dmax", the maximum current which may be supplied by the system is about equal to:

$$ILmax \approx ILr \, dmax \quad (4.1.2)$$

The conduction interval is now proportional to the required average current and practically does not depend on the output voltage.

As already said, analysis of operation and performances obtainable by a current control system operating according to the above explained mode will now follow.

Figure 11:
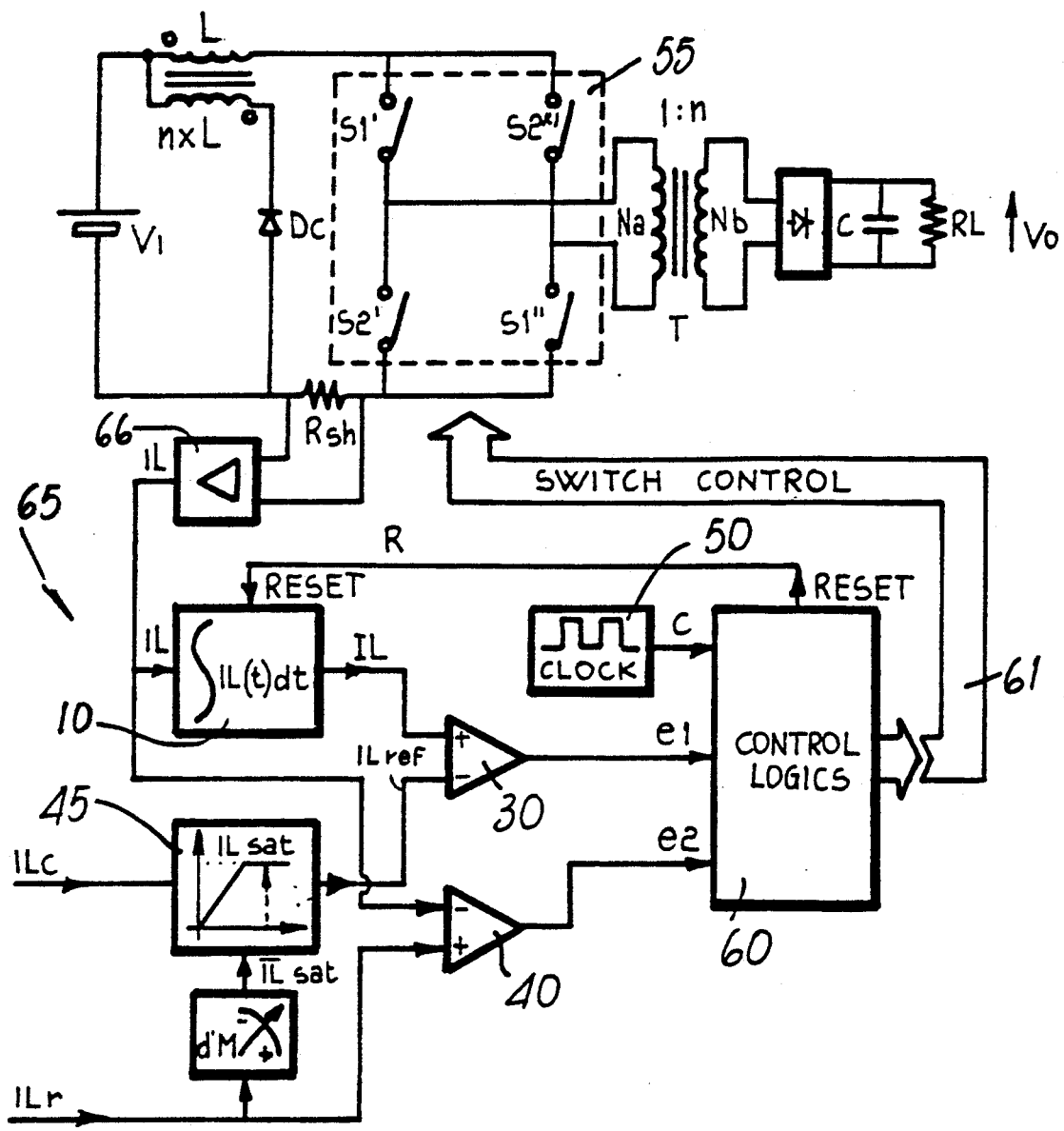
FIG. 11 is a principle block diagram of a preferred embodiment of the control logics comprised in DC-DC converter system according to the invention.

To this end, let's consider the principle block diagram shown in FIG. 11.

Therein, besides of the well known controller power section a logic unit is provided which directly controls the bridge switches through lines 61. This unit in turn communicates, through four control lines, with the section 65 which will be hereinafter named as the analog section of the entire system. This latter accepts, as the inputs, on one hand the control signal "ILc", that is the average current value which is intended to be supplied to the load, on the other hand the instantaneous inductor current "iL" which is indirectly obtained through a shunt (Rsh) which, together with the amplifier 66 which is cascade-connected therewith, defines the feadback network of the control system.

Independently from the specific contingent implementation of the entire circuit, a clarification is necessary in order to clarify the apparent incompatibility between the electrical quantities considered in the scope of the analog section and the respective dimensions.

In fact currents and voltages having the meaning of currents indifferently appear in the diagram. Although this situation does not generate any problem for the principle block diagram of FIG. 11, it is clear that, when the system is to be implemented, all the currents of the control section will be represented by voltages, since the latter are easier to be handled.

In the light of the above, an expression of the type "ILc (1V/A)" means that "ILc" represents a current by means of a voltage which assumes the value of one volt for each actual current unit.

Turning back to the block diagram of FIG. 11, the meaning of the quantities contained therein and the elementary functions which are performed by the various sections are now explained.

"IL" defines the current value which is intended to be set in the inductor and may be varied between zero and the preset maximum.

This reference is continuously compared with the actual current of the reactive element by virtue of a comparator 40 the output whereof "e2" represents one of the control logics 60 inputs.

Simultaneously, through the multiplier "d'M", "ILr" determines the saturation level of the limiter block 45 to the input whereof the external control signal "ILc" is applied. Thereby, upon assigning a well defined value to the multiplicative constant "d'M", by altering the reference level "ILr", the maximum allowable value for the control signal will vary.

Therefore, by naming "ILsat" the saturation current, the output "ILref" of the limiter will assume the following values:

$$ILref = ILc \text{ for } ILc < ILsat$$

$$ILref = ILsat \text{ for } ILc > ILsat$$

This clipping of "ILc" is due, as will be seen hereinbelow, to a double need.

The current "iL", that is the quantity which is to be controlled as to both instantaneous and average value, is integrated at each clock cycle when its instantaneous average value "IL" is continuously compared with the control quantity "ILc" (for the time being we will suppose ILsat = + ∞).

The result of this comparison (output of comparator 30) defines a further control signal (e1).

At least the clock generator 50 has the function of timing the logics 60 while the signal identified by "R" causes resetting of the integrator.

The operative modes of the above explained control system are now described.

During the analysis, the block diagram of FIG. 11 is continuously referred to.

At each clock pulse (leading edge) the control logics 60 turns on one of the bridge 55 diagonal sides or links (as an example S1', S1") and turns off the network signal. Thereby, supposing that the current in "L" is equal to "ILr", a power transfer is caused to the load which is flown by an instantaneous current equal to "iL/n".

In the meantime, by supposing a BUCK-type operation (Vo/n < Vi), a modest increase of "iL" is observed, the entity whereof depends on the values of "L" and "Vo".

On the matter it should be stressed that the operation of the converter is not rigidly bound to the current ripple generated in the inductor, even if, as will be seen, besides of the maximum error of the circuit in ensuring "ILr", also the position and the stability of some among the different system operation modes depend thereon.

If a signal "e1" different from zero is present at the control input, this first part of the cycle continues until the average current supplied to the load and calculated by the integrator becomes equal to the preset one (IL = ILc). At this point "e1" changes state, causing the logics to detect the value of "e2", to turn off the diagonal side conduction and to reset the integrator by means of the reset signal R.

In this first cycle part the system output quantity, that is the average current supplied to the load or more exactly the transformer input current, has been controlled.

The second clock cycle part is instead exploited for controlling "iL".

If the value of "e2", sampled at the end of the conduction phase of the diagonal side, is equal to one, this means that in that instant "iL < IL". All four switches of bridge 55 are then closed for the remaining part of the period, thus increasing the current in "L".

If the sample value is equal to zero, "iL" should be reduced and to this end the control section closes the switches "S2', S1", thus causing an energy transfer from the inductor to the power supply through the secondary winding coupled to the "L".

In the subsequent cycle the logics operates in an analogous manner on the complementary switch pair.

Of course, the energy "transfer" phase from the inductor to the power supply does not require, per se, closure of the switches belonging to one of the bridge sides. This last operation is instead due to the need of avoiding all or part of the transformer magnetization energy being transferred to the load at each cycle.

Upon one bridge side has turned on, the magnetizing current may circulate through a loop with very low resistance, thus limiting the losses due to the Joule effect and improving the output current control.

An analogous situation occurs also during the "iL" regeneration phases (active reset phases) that is when all the switches are closed.

It is also clear that the magnetizing current "freezing" during the OFF phases allows a reduction in the variations of this same current and thus of the flux during an entire converter cycle, thus limiting the losses in the iron.

Figure 12:
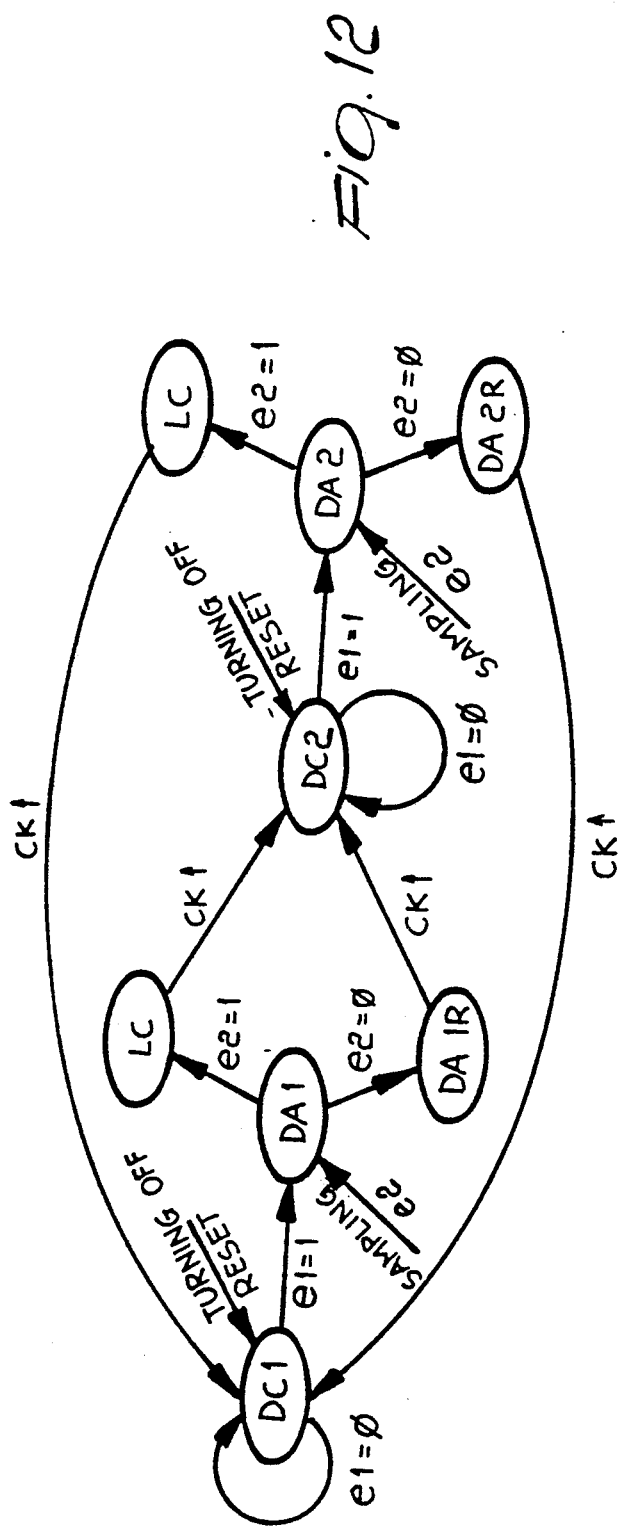
FIG. 12 a state diagram of the control logics of FIG. 11.

The state diagram of FIG. 12 reassumes the system operation modes. The meaning of the states is the following:

DC→closed diagonal side

DA→open diagonal side (active integrator reset)

DAR→open diagonal side with energy recover

LC→closed sides

It should be noted that if "ILc" is slightly negative or anyhow such as to nullify "e1", "e2" should be sampled first on the clock leading edge (that is at the beginning of the cycle), in order to avail of the information which is necessary to set forth the reset phase modes.

Furthermore it is not excluded that "e2" may be sampled always only at the first instant of the period, to then proceed, during the "OFF" phase, with reference to such value.

If the current ripple in "L" is low, the two different modes for sampling "e2" give equal results.

Figure 13:
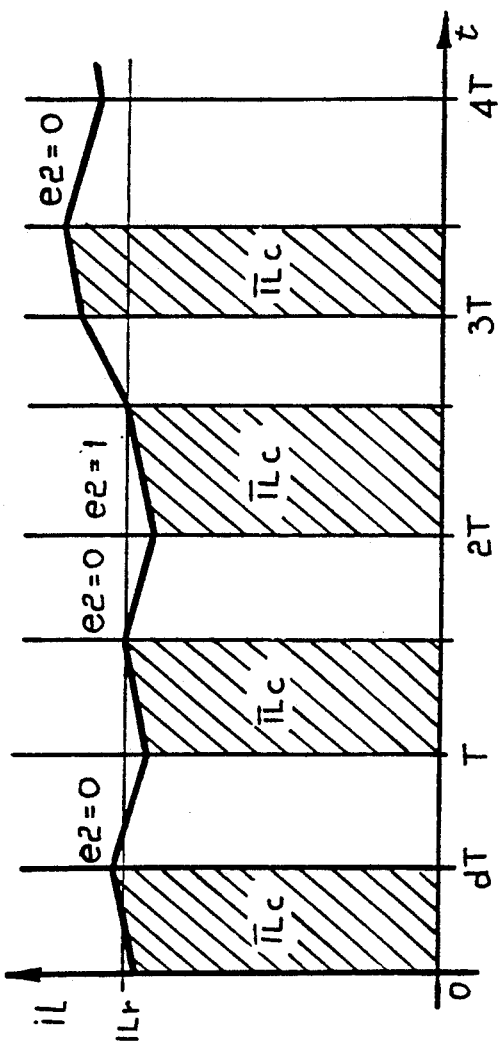
FIG. 13 is a diagram showing the behavior of "iL" (inductor current) when sampling is performed at the end of the conduction phase.

FIG. 13 shows the plot of "iL" when sampling is carried out at the end of the conduction phase.

Before proceeding in evaluating the performances and operation limits of the proposed circuit, let's briefly summarize the functions it performs.

The circuit simultaneously controls two quantities. The first one is the average current in "L", that is the average current supplied to the load. The second one is the instantaneous current in "L", that is the energy state of the inductor.

The two controls are performed at different times: the first one during the conduction phase of one of the bridge diagonal sides (ON phase, during which energy is supplied to the load), the second one in the remaining part of the period (OFF phase).

The conduction state, which in borderline cases may not occur at all when the control input is set to zero or to negative values, ends when the average value of the current transferred by the integrator becomes equal to the required one.

The error due to the circuit is theoretically nihil, i.e. the output quantity does not differ from the reference one.

Inductor current control in instead performed in the second cycle part, that is upon the ON phase has ended.

Such control comprises two possibilities.

If at the end of the ON phase, the current "iL" is higher than the value preset as the reference (ILr), such current should be reduced by transferring part thereof to the power supply through the secondary winding of the mutual inductor. To this end it is sufficient to open all the bridge switches or at least the pair belonging to one of the basis.

If instead the current is lower than the reference value, such current is increased by closing the switch pair belonging to one of the arms of the bridge (in practice, all four switches are activated or closed).

In this case, the current "iL" remains close to the reference current and the amplitude of such range may be reduced at will by increasing the inductance of "L".

In any case, it should be stressed that the efficiency of the average current control is not at all jeopardized by the error inherent in the instantaneous current control system, the only aim whereof being that of ensuring always and in any case the availability of a minimum reserve of energy in "L" as well as avoiding that preset current thresholds be exceeded.

If the turn on and off times of the switches are such as to allow it, it is possible to adopt an OFF multiswitching phase wherein the system alternately switches from the active reset to the recover state. Thereby the error on the inductor energy state affecting the initial phase of each cycle is drastically reduced. If this solution which however brings to an unavoidable loss increase is abandoned, it will be necessary to dimension the inductor such as to maintain the current ripple within suitable values.

Up to now, a BUCK operation has been implicitly assumed.

Even if with some restraint on "Vo", the circuit proposed in FIG. 11 operates very well also in the BOOST mode, that is when the voltage across the transformer primary winding is higher than the power supply voltage. The passage between this two operation modes occurs in an automatic manner and the borderline between them has no discontinuities, as will be seen hereinafter.

Let's now turn back to the BUCK mode and define the duty-cycle allowing a preset operation current "ILr" as a function of the output voltage to be maintained.

In other words, let's impose the condition that the current increase generated in the ON phase is completely compensated in the subsequent OFF phase (reset or recover phase).

Therefore it will exist a maximum "d" (dM) above which the recover phase is not sufficient to recover the initial current. In this case, a current increase in "L" will be observed, the entity whereof will now be evaluated.

The variations of "iL" during the cycle active phase and the subsequent recover are, respectively:

$$vI+ = (Vi - Vo/n)\, dMT/L$$

$$vI- = Vi\,(1 - dM)T/(nx\, L)$$

and, since for $d = dM \rightarrow vI+ = vI-$, it follows:

$$Vi(1 - dM)/nx = (Vi - Vo/n)dM$$

which solved with respect to dM gives:

$$dM = \frac{Vi/nx}{Vi\,(1 + 1/nx) - Vo/n} \qquad (4.3.1)$$

Figure 14:
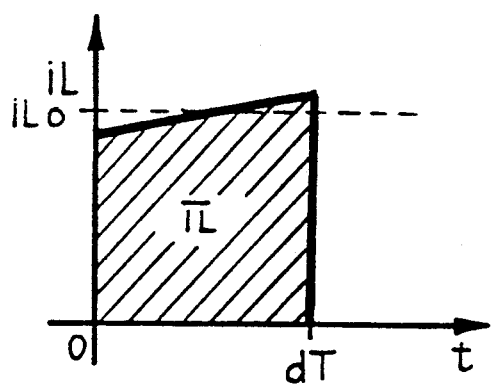
FIGS. 14, 15 and 16 are further diagrams which are useful to understand the operation of the DC converter according to the present invention.

From FIG. 14 it is clear that a reduction of "Vo" gives rise to a reduction in the maximum duty-cycle which is able to ensure resetting of "ILr".

In the case in which the ripple in "L" may be neglected, it follows that iL=iLo (FIG. 14) and thus:

$$IL \simeq iLo d$$

thus if "iLo" is the reference current and "d" should not exceed "dM", the maximum allowed value for "IL" is:

$$ILsat \simeq dM\, ILr \qquad (4.3.2)$$

The maximum allowed duty-cycle is thus not exceeded if the saturation threshold of the input limiter is equal to "ILsat". This value is linearly bound to the reference current resulting from (4.3.2).

In FIG. 11, the function expressed by the (4.3.2) is accomplished by block "d'M" which instantaneously adapts "ILsat" to the preset reference. It will be sufficient to set d'M<dM.

Of course, the approximation degree of the (4.3.2) depends on the inductor current ripple. Let's see how to interpret this expression by taking into account this last effect.

Let's still start with the (4.3.1) which defines the maximum "d" which is able to ensure the recover in "L".

Figure 15:
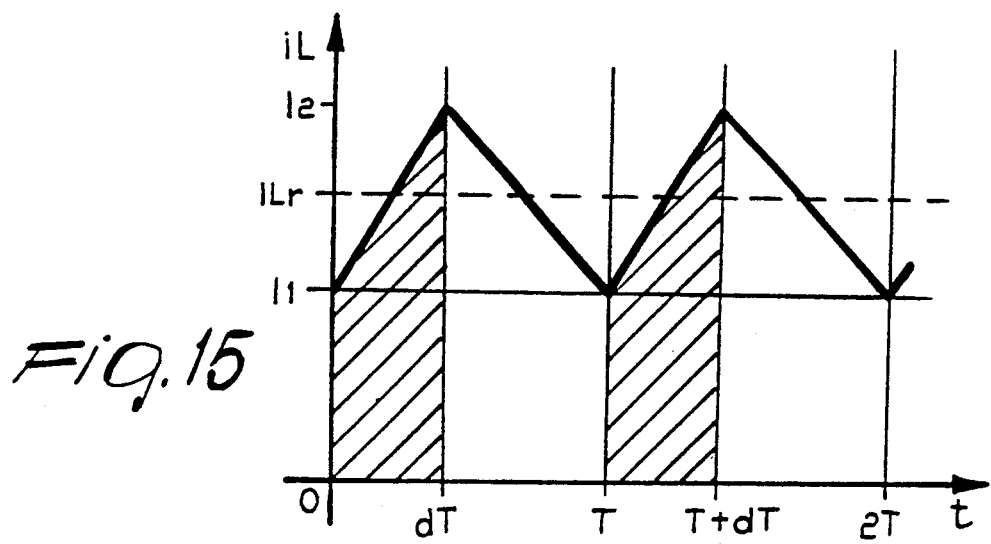

Suppose that at the maximum current, equal to "ILsat", the operation shown in FIG. 15 and characterized by an "ILr" set on the centerline of iLmax=I2 and by iLmin=I1 is desired.

This is a stable operation mode with only recover phases. In fact, if e.g. "vI+" exceeded "vI−", the current in "L" would increase causing a decrease of "d" (the hatched area which defines "ILsat" should remain constant). Therefore "vI+" will decrease and "vI−" will increase. An opposite behavior is instead obtained in the hypothesis that vI+ <vI−.

Therefore it follows:

$$ILr = (I1 + I2)/2$$

and $$ILsat = \left(\frac{I1 + I2}{2}\right) d_M = ILr \, d_M$$

The (4.3.2) is still obtained.

Thus the (4.3.2) defines the value of "ILsat" which assures maintenance of "ILr" with a plot of "iL" comprised in a symmetric neighbourhood thereof.

Figure 16:
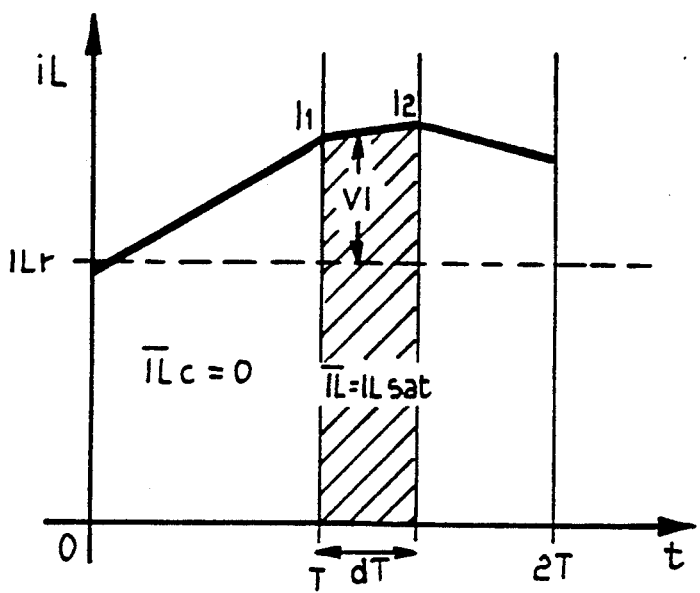

By considering the system operation logic, the maximum current flowing through the inductor may be calculated in the worst case. This is when the control input changes from zero to the maximum value between a clock period and the subsequent one and the current in "L" at the beginning of the first period is slightly lower than the reference one (FIG. 16).

In these conditions, the OFF phase will cause an increase of "iL", followed by a subsequent further increase and then a recover phase.

Thus $$vI = ViT/L$$

$$I1 = ILr + vI = ILr + ViT/L$$

while, for the subsequent period:

$$ILsat = (I1 + I2)d/2 \rightarrow I2 = 2ILsat/d - I1$$

and finally:

$$ILmax = 2ILsat/d - ViT/L - ILr \quad (4.3.3)$$

Let's now evaluate d=f(Vo, IL, I1).

After some simple relations, the following is obtained:

$$IL = I1 d + K d^2 \quad (4.3.4)$$

with $K = (Vi - Vo/n) \, T/2L$

From (4.3.3) "d" can finally be obtained.

$$d = [(I1^2 + 4KIL)^{\frac{1}{2}} - I1]/2K \quad (4.3.5)$$

By evaluating the (4.3.5) for IL=ILsat and "Vo" equal to the minimum allowable output voltage and replacing the result in (4.3.3), the maximum theoretic instantaneous value of "iL" is obtained.

The thus obtained value is valid in normal operation conditions, that is in the output voltage range for which maintenance of "ILr" is ensured.

The (4.3.3) may be also verified for L→∞, in which case ILmax=ILr.

Now it is useful to emphasize the meaning of the (4.3.1). This expression defines the maximum allowable "d" for a preset output voltage, above which the inductor current is forced to increase with respect to the value which has been selected as the reference.

In other words, the (4.3.1) defines the balance "d" which establishes when the current required by the control input exceeds the maximum allowable value for the preset reference level or the output voltage decreases under the limit value at which the maintenance of "ILr" is preset through a control signal equal to "ILsat".

By thus naming "Vocrt" the value of "Vo" at which "dM" has been calculated, if IL>ILsat at "Vocrt", "d" tends to exceed "dM". Such condition causes vI+ to be higher than vI−, with consequent current increase in "L" until a new equilibrium condition establishes at which: "d=dM" and "vI+=vI−".

The new current in "L" in this case is equal to:

$$iLo = IL/dM \quad (4.3.6)$$

When Vo<Vocrt at "ILsat", in order to obtain "iLo" it suffices to evaluate the new equilibrium value of "d" which will be named "dM1". In these conditions, iLo>ILr is still valid and in particular:

$$iLo = ILsat/dM1$$

Figure 17:
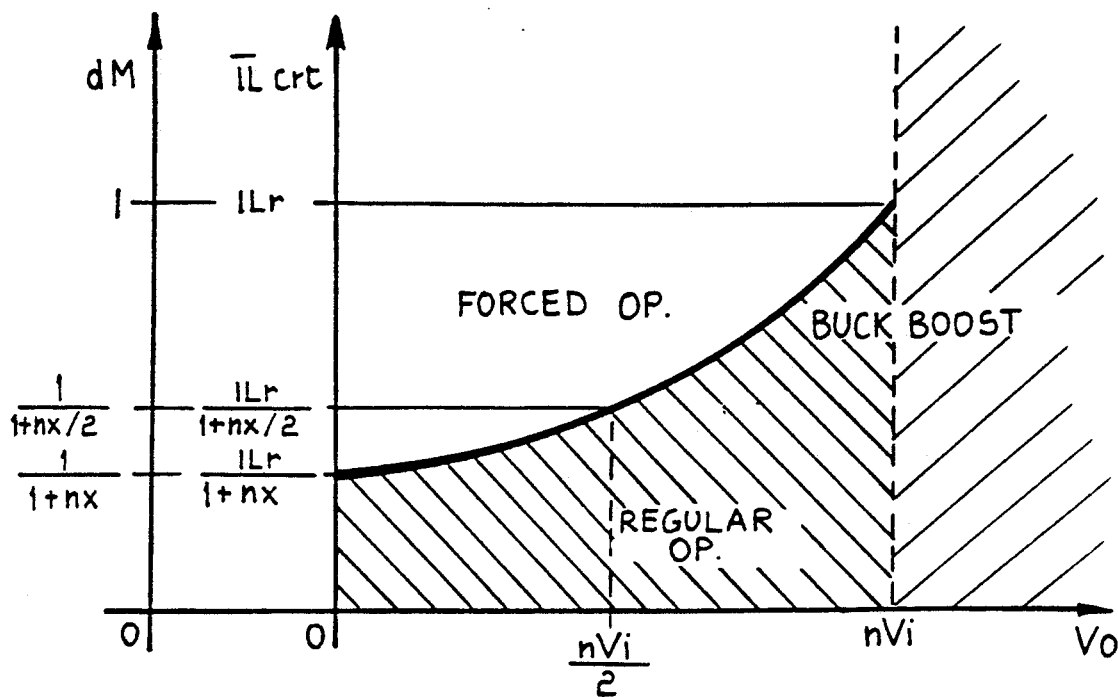
FIGS. 17, 18 and 19 are further diagrams which are useful to understand the operation of the present DC converter in the BUCK operating mode.

At least generally, if the fact is neglected that the input current is limited up to "ILsat", the borderline between "regular" (that is when "ILr" is maintained) and the so-called "forced" operation (that is with iLo->ILr and with reset states with only recover operation) is expressed by the (4.3.7) and graphically pointed out in FIG. 17.

That is:

$$ILcrt = ILr \, dM$$

and thus:

$$ILcrt = \frac{ILr \, V_1}{nx[V_1(1 + 1/nx) - Vo/n]} \quad (4.3.7)$$

It has been already seen that the condition ILsat=dMILr may be exceeded even if, in the case of Vo=−Vocrt, this occurs at the expense of an increase of "iLo" behind the reference value.

In these conditions, however a dynamic limit to the "vIL" rises.

Such limit is due to the fact that an average current which is higher than the one obtainable with a conduction ratio equal to the unity (d=1) cannot be instantaneously obtained (that is within a maximum time equal to the clock period).

Therefore, if a control average current which is higher than the reference one in the inductor is fed to the system input, it is the "L" which imposes speed limits.

In fact the increase of "iLo" should be waited, which, in consideration of the high inductance value employed in this implementation type, is perceived only after numerous clock cycles.

The system dynamic range is thus ensured in any case if $$ILsatmax > ILr \quad (4.3.8)$$

Figure 18:
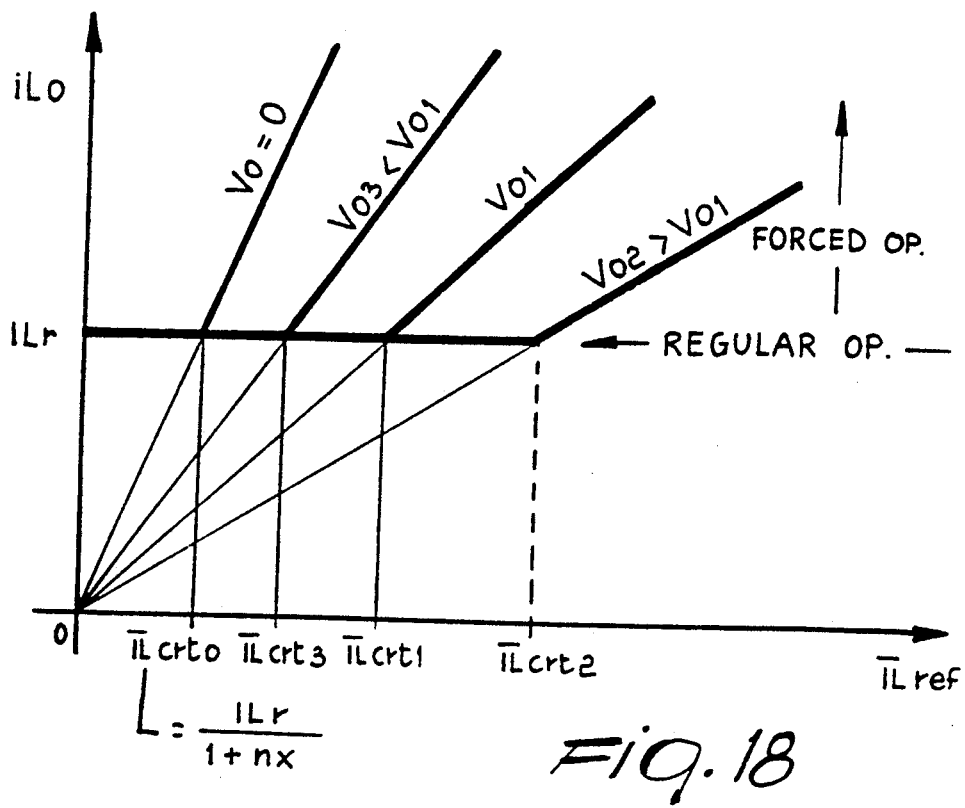

FIG. 18 shows the qualitative plot of "iLo" in the steady state as a function of "IL" for different values of "Vo".

Figure 19:
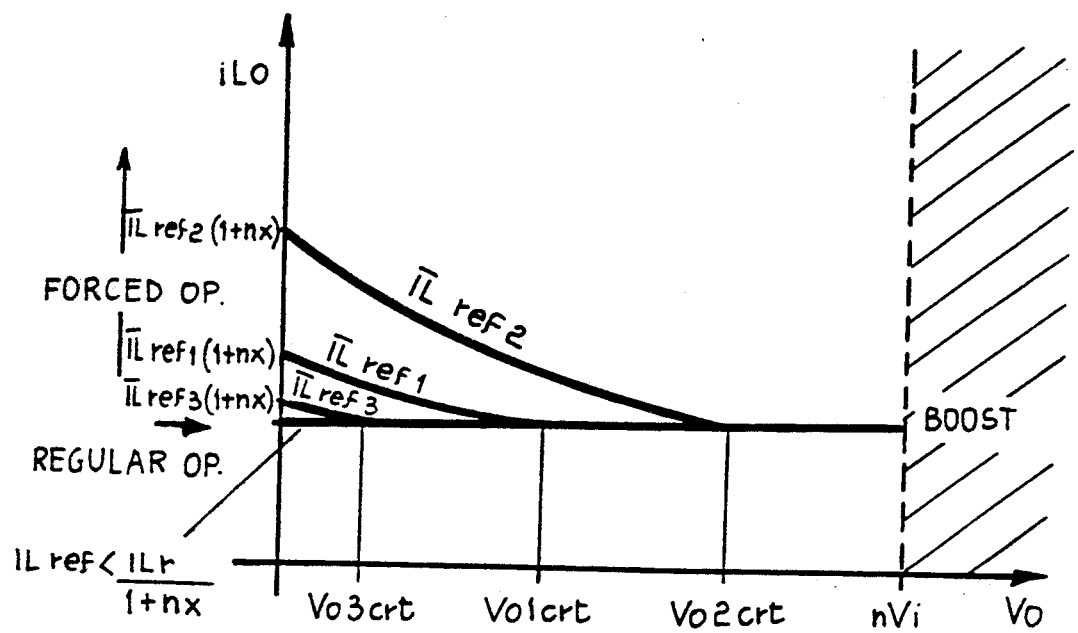

FIG. 19 instead shows the behavior of "iLo" in the steady state as a function of "IL" for different values of "ILref".

If during the forced operation it is desired to exactly know the inductor peak current it will be sufficient to make explicit the function:

$$IL = f(Vo, d, I_2)$$

obtaining, with a procedure which is analogous to the one used to express the (4.3.4):

$$IL = (I_2 d - K d^2)/2 \quad (4.3.9)$$

with $$K = (Vi - Vo/n) \, T/2L$$

and, by solving the (4.3.9) with respect to "$I_2$", the following is obtained:

$$iLmax = (IL + Kd^2)/2d \quad (4.3.10)$$

wherein "d", "Vo" and "IL" are calculated at the forced operation point, the iLmax whereof is desired to know.

"d" will still be calculated from the (4.3.1).

As already indicated, the above described control logics may be efficiently exploited to operate the system in the BOOST mode, that is with voltages downstream of the inductor which are higher than the supply voltage.

By considering the operation principle of the control system, it can be easily seen that the transition between the two possible operating modes occurs automatically and without giving rise to any discontinuity on the more significant electrical quantities.

It can also be seen that the zone in which the converter has its better performances as to maximum current which can be supplied, is just the neighbourhood of the borderline between the two operation modes (Vo=nVi). This is due to the fact that, in this zone, the variation of the "iL" during the ON phase is practically nihil and thus the conduction state may extend on the entire clock period, while the time which is requested for resetting "iLr" is very limited or even nihil.

Figure 20:
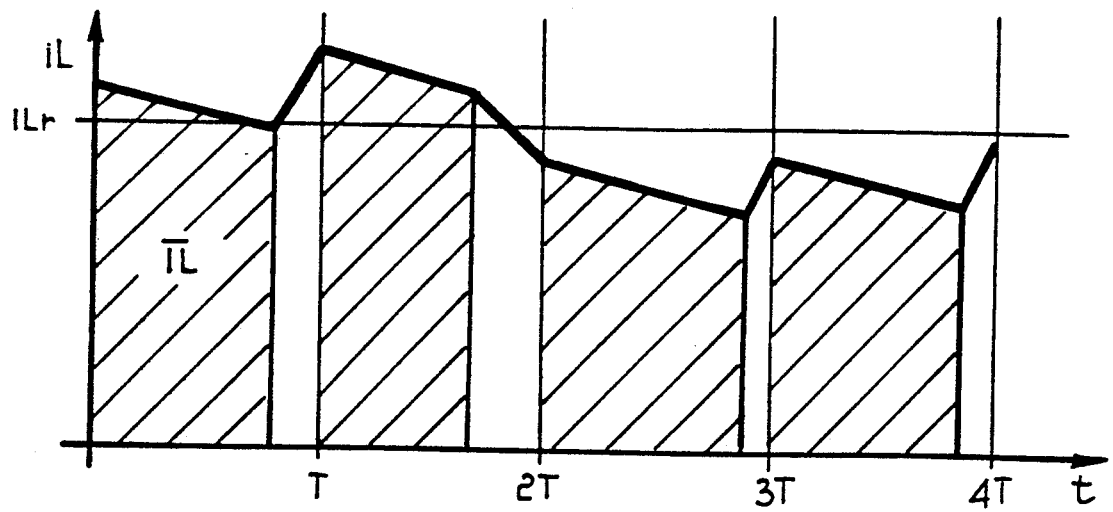
FIGS. 20, 21, 22 and 23 are further diagrams which are useful to understand the operation of the present DC converter in the BOOST mode.

FIG. 20 shows the plot of "iL" during the BOOST operation. Therefrom it can be noted that the reset logics operates analogously to the BUCK mode. The slope of "iL" during the active phases is now negative, since the voltage which is reflected on the secondary winding of the transformer is higher than "Vi".

As already said, in the BUCK mode the control average current may also exceed the maximum allowed value. An "anomalous" operation mode thus establishes which is characterized by OFF phases with only recover and an inductor current which is higher than the one preset as the reference.

In the BOOST mode, analogously to the BUCK mode, it will be necessary to avoid that preset current thresholds be exceeded in order to give the OFF phase a sufficient time to allow reset of the "iL". Otherwise the inductor current would decrease.

In other words, while in the BUCK operation the problem was to ensure that the recover phase has a sufficient time to dissipate the excess energy which has been loaded during the active phase, in the BOOST operation the problem is the opposite one and consists in assuring that the reset phase has the possibility of compensating the current drop occurred during the conduction phase.

If in the neighbourhood of the borderline between this two operation modes regeneration of "iL" does not pose particular problems, in the subsequent zone this regeneration becomes more and more difficult.

Figure 21:
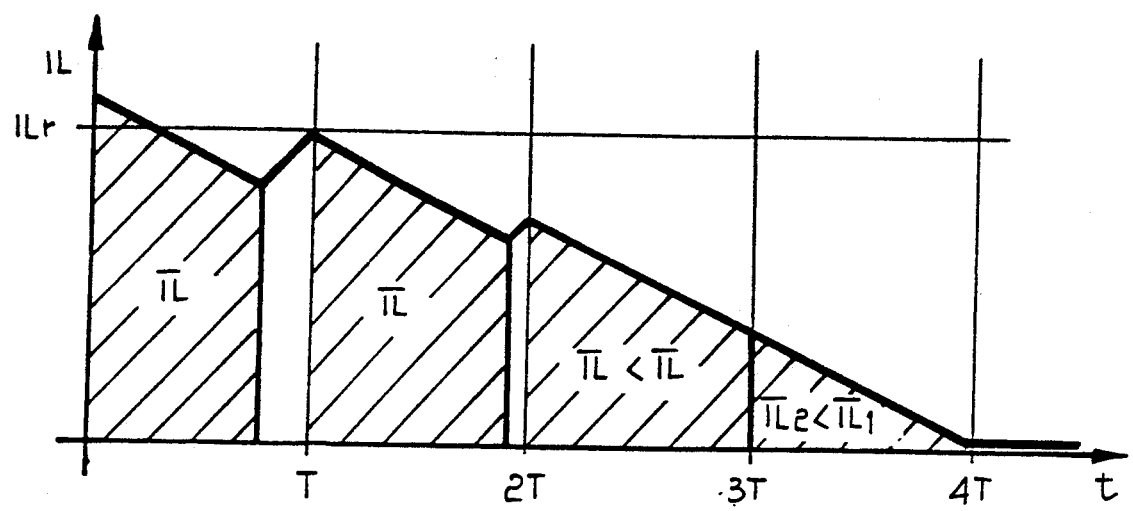

In particular, when "ILr" cannot be regenerated, the circuit operating in the BOOST mode turns off, that is "iL" decreases down to zero (FIG. 21). In these conditions, in fact, $|VIon| > |VIoff|$ and thus the inductor current decreases, forcing "d" to such an increase as to further reduce the time employed for regeneration of "iL".

By neglecting the current ripple in the inductor, let's calculate the maximum admissible value of "IL" for a preset Vo.

In the limit condition the equation $$vI- = vI+$$

is satisfied with $$vI- = (Vo/n - Vi) \, dT/L$$

$$vI+ = (1-d) \, ViT/L$$

by comparing the two expressions and solving as a function of "d", the following is obtained:

$$dM1 = Vin/Vo$$

wherein "dM1" indicates the maximum admissible duty-cycle for a correct BOOST operation of the system.

On the other hand "dM1" is also equal to:

$$dM1 \approx ILcrt/ILr$$

and finally, by equalizing the two expressions of "dM1", the following is obtained:

$$Ilcrt = ILr \, Vi \, n/Vo \quad (4.4.1)$$

The (4.4.1) is valid only for the BOOST mode, that is for Vo>nVi. Therefrom it can be noted that by reducing the value of "Vo", "ILcrt" increases. As already said, a behavior of this type is due to the progressive slope decrease of the "iL" during the active phases of the cycle and thus to the possibility of prolonging the same without interfering on the correct occurrence of the reset phase.

The (4.4.1) may be rewritten by making it explicit with respect to "Vo". Therefore:

$$Vocrt = ILr\, Vi\, n/IL \quad (4.4.2)$$

In practice, the borderline between regular operation region and switching off region is determined by the equilateral hyperbola:

$$VoIL = VilLrn \quad$$

Therefore, in the BOOST mode, the maximum power which may be supplied to the load does not depend on "Vo" and is equal to the product between the supply voltage and the inductor reference current.

Thus the power to the load can be increased only by increasing "ILr".

Summarizing, while in the BUCK mode the system may operate for each "Vo", although on the expenses of a higher "iLo" than the reference one, in the BOOST mode, it is not possible to supply a current which is higher than "ILcrt".

As already observed, the current which can be supplied in the BOOST mode is maximum in the neighbourhood of the borderline "Vo=nVi" and is equal to "ILr" (with n=1).

Although on the BUCK side the output current in the steady state has no theoretical limit, it should be observed that near the transition zone between the two operating modes, since the slope of "iL" is practically nihil, currents "IL" higher than "ILr" can be obtained only with considerable delays.

Turning back to the (4.3.1), calculated for the BUCK mode, and making it explicit as a function of "Vo" it will be obtained:

$$Vo = nVi\left[1 + \frac{1}{n_n}\left(1 - \frac{1}{d_M}\right)\right] \quad (4.4.3)$$

The (4.4.3) defines the minimum "Vo" such as to ensure a value of "d" lower than "dM".

By further remembering that $$d_n = IL/ILr$$

and replacing this latter in the (4.4.3), the following is obtained:

$$Vomin = nVi\left[1 + \frac{1}{n_n}\left(1 - \frac{ILr}{IL}\right)\right] \quad (4.4.4)$$

which, reformulated together with the (4.4.2), valid for the BOOST mode, gives:

$$nVi\left[1 + \frac{1}{n_n}\left(1 - \frac{ILr}{IL}\right)\right] < Vo < nVi\frac{ILr}{IL} \quad (4.4.5)$$

The (4.4.5) defines the output voltage range within which the converter has a regular operation.

The width of this range may be varied by acting on the input limiter and on "ILr".

Figure 22:
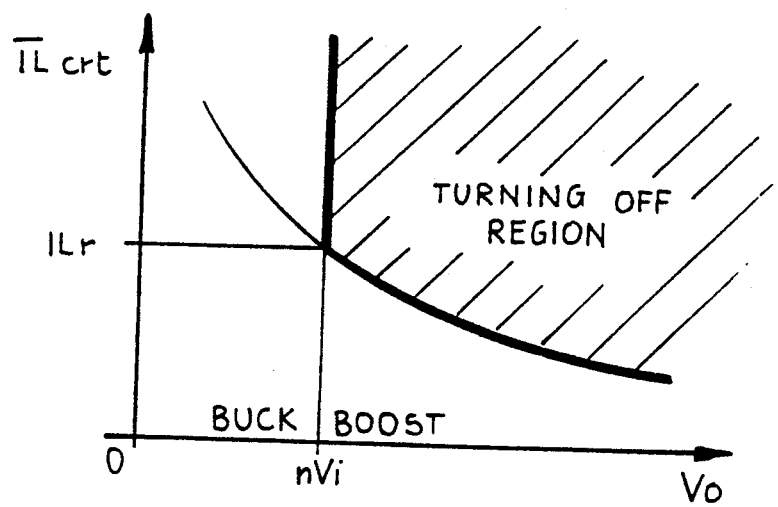

In the structure of FIG. 22, wherein the threshold of the limiter is linearly related to the inductor reference current, the extremes of the (4.4.5) may be varied by simply acting on "$d'_M$", while they do not change as a consequence of changes of "ILr".

Exceeding of the upper extreme defined by the (4.4.5) involves, as said, interruption of the "iL", that is system turning off.

A possible solution to avoid this may consist of rendering "ILsat" dependent on "Vo" by imposing that $$\text{Ilsat } Vo < nVi\, ILr$$

As least point, the switching off boundary is expressed when "L" is assigned a finite value. Inductor current regeneration is made possible only if:

$$d < dM = Vi\, n/Vo \quad (4.4.6)$$

It should be stressed that with a same supplied average current, as "iL" decreases, the duty-cycle becomes longer.

The worst case is when a first period, characterized by a nihil control current and a recover-type OFF phase, is followed by a well preset current demand.

Figure 23:
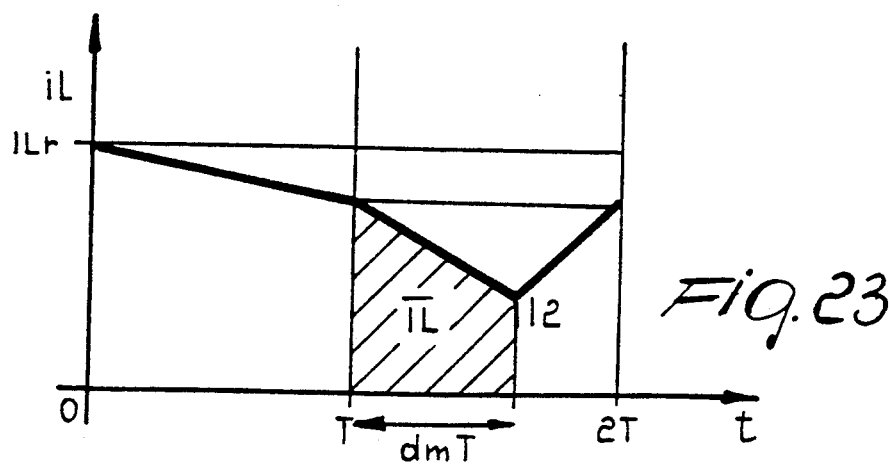

FIG. 23 exemplifies this particular situation.

For "I1", we have:

$$I1 = ILr\frac{Vi\, T}{Lnk} \quad (4.4.7)$$

while for the expression $$IL = f(I1, Vo, dM)$$

from simple calculations it follows:

$$I1 = I1\, dM1 - K'dM1^2 \quad (4.4.8)$$

with $K' = (Vo\, Vi/n)\, T/2L$ remembering that $$dM1 = Vi\, n/Vo$$

and inserting this expression in (4.4.8), it follows:

$$IL = \frac{Ii\, Vi\, n}{Vo}\left(\frac{Vo}{n} - Vi\right)\frac{T}{2L} - \frac{Vi^2\, n^2}{Vo^2}$$

which, solved as a function of "Vo" and neglecting the negative solution, gives the (4.4.9).

$$Vocrt = \frac{Vi\, n\left(I1 - \frac{Vi\, T}{2L}\right) + \left[Vi^2\, n^2\left(I1 - \frac{Vi\, T}{2L}\right)^2 + \frac{2ILVi^3\, n^2\, T}{L}\right]^{\frac{1}{2}}}{2IL} \quad (4.4.9)$$

In particular, the (4.4.9) may be verified for $L \to \infty$. From (4.4.7) we have:

$$\lim I1 = ILr \text{ for } L \to \infty$$

and from (4.4.9)

$$\lim Vocrt = Vi\, n\, I1/IL \text{ for } L \to \infty$$

and thus $$Vocrt = Vi\, n\, ILr/IL = Vi\, n/dM1$$

The above discussed control circuit thus allows both the BUCK and the BOOST operation modes and the passage from the first to the second one only implies some limitations on the static performances of the system.

In particular, for the BOOST mode it has been seen that when the power supplied to the load exceeds the critic value expressed by the (4.5.1) (see below), the current flowing in the inductor nullifies.

$$Po = Vo \, Io = Vi \, ILr \qquad (4.5.1)$$

Figure 24:
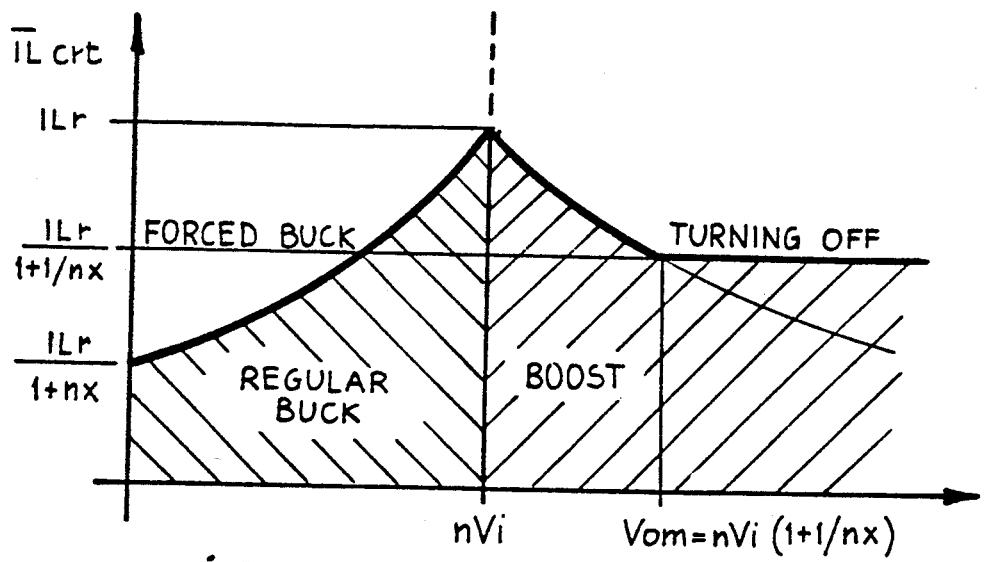
FIGS. 24, 25 and 26 respectively show the areas of possible exploitation of the converter and the reset modes respectively with constant voltage and current upon the converter has been switched off.
Figure 25:
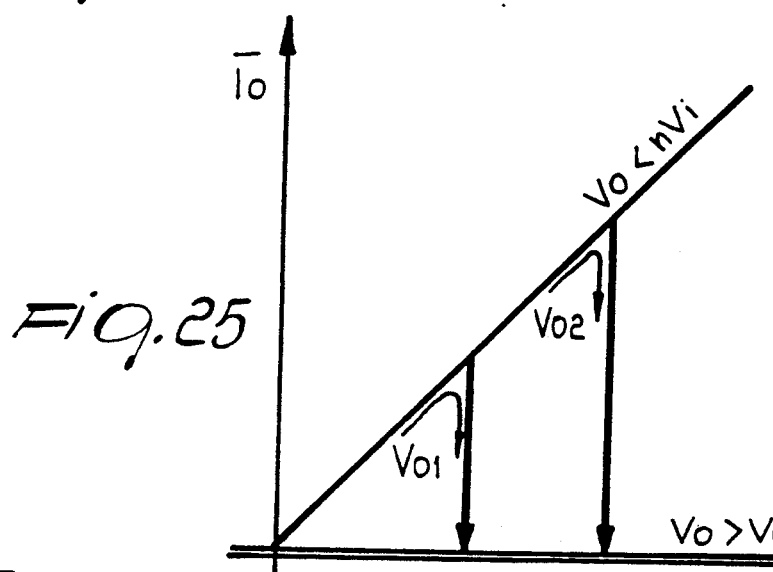
Figure 26:
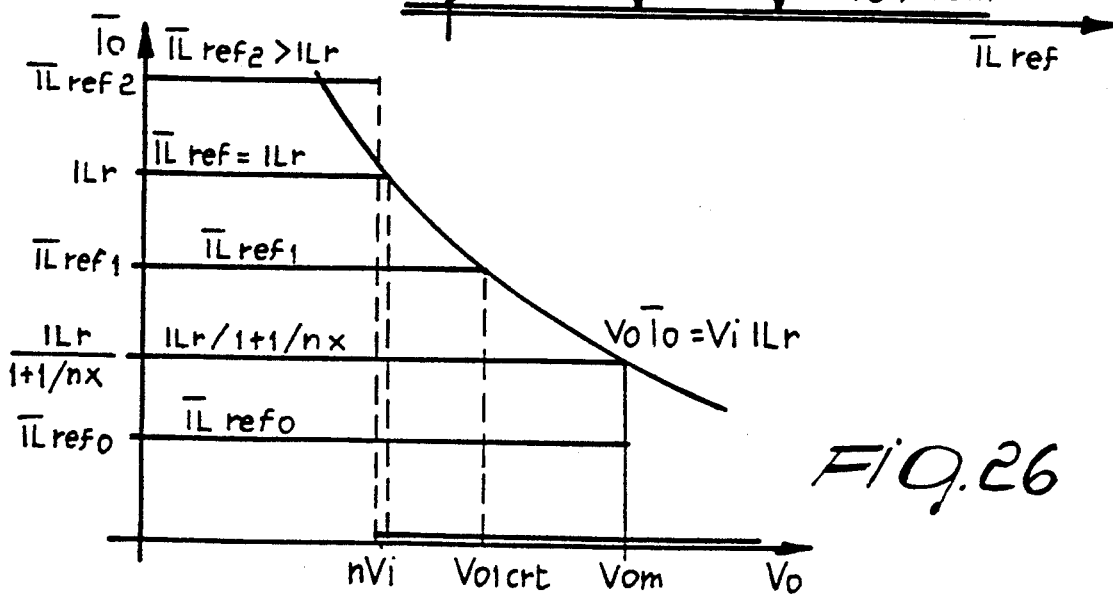

FIG. 24 shows regions of a possible exploitation of the converter, while FIGS. 25 and 26 point out the reset modes with respectively constant voltage and current upon turning off.

In particular, reactivation of the system, or better the reset of the nominal current in the inductor may be obtained in two different modes:

1—The recover phase may be forcedly activated (FIG. 25) causing the input control to be set at a negative value or in any case such as to nullify the comparator output "e1" of FIG. 11.

2—The BUCK operation may be forced by bounding "Vo" to a lower voltage than the borderline one "Vo=nCi" (FIG. 26).

The first operation mode is surely the quicker one and allows reintegration of the nominal energy state of the inductor in a time equal to:

$$trig = ILr \, L/Vi \qquad (4.5.2)$$

Besides of the restraint as to the maximum power to be supplied in the BOOST mode, by examining with attention the structure of the power stage, a further limitation can be defined as to the output voltage.

As above indicated, the BOOST mode does not provide for the secondary winding to be coupled to inductor since no energy recover is required.

It is thus clear that, if both operating modes are required, the effects due to the mutual coupling between "L" and the power supply should be considered with care, in particular in those states in which no energy recover is provided for.

To this end, let's suppose that the system is working in the BOOST mode. In these conditions, during the ON phase, the voltage downstream of "LO" exceeds "Vi", determining on the "Nk2" secondary windings a potential difference which has a different sign from the power supply and such as to cause "Dc" (free-wheeling diode) to conduct, if such difference is sufficiently high. Therefore a forced energy recover thus occurs, since the current in the inductor, instead of flowing towards the load, closes through "Dc" onto the power supply.

This occurs for $$(Vo/n - Vi)nx > Vi$$

thus the following is valid:

$$VoM = nVi \, (1 + 1/nx) \qquad (4.5.3)$$

When the output voltage exceeds the maximum value given by the (4.5.3), "Io" decreases down to zero and the conduction phase becomes a forced-recover reset state.

Thus for Vo>VoM the energy passes from the power supply to the inductor during the reset phases, while during the active phases, energy flows from the "L" to the power supply and its entity is determined by the current value which is required at the control input thereof.

The energy transfer existing between inductor and power source is for many aspects similar to the one occurring when the control input is set to zero or when the system is turned off through the related input (which is in fact equivalent).

For Vo>VoM the critical current, beyond which the converter turns off, is constant and corresponds to the one calculated for "VoM".

By replacing (4.5.3) in the (4.4.1), we obtain:

$$ILcrt \, (Vo > VoM) = ILr/(1 + 1/nx) \qquad (4.5.4)$$

The above is clearly deducible from FIG. 24, the transfer function of FIG. 25 and the output function of FIG. 26.

It should be stressed that if Vo>VoM (and thus Io=0), when the critical current expressed by (4.5.4) is exceeded, the system is turned off and all the energy stored in the inductor is fed to the power supply.

The output voltage range which may be used in the BOOST operation may be varied by acting on the winding ratio of the mutual inductor.

A high transformation ratio implies a relative small working voltage range.

Low ratios however, besides of increasing "VoM", allow to reduce the output critical voltage in the BUCK mode, i.e. the value of "Vo" under which regular operation becomes forced.

It should not be forgotten that the maximum theoretical voltage across the bridge, which is obtained during the recover phase, coincides with "VoM".

It is thus fundamental to conciliate the need of extending the voltage range which is useful for the converter exploitation with that of avoiding, downstream of "L", potentials which are dangerous for the bridge switches.

This last measure is particularly felt in case of relatively high supply voltages, that is near to the breakdown voltage of the available switches.

A situation of this type requires a high "nx" ratio and practically limits the converter to a BUCK type operation. Furthermore, "dM" will be relatively low for a given "Vo", and the high ratio between reference current and maximum average current which will establish implies overdimensioning of the power stage with respect to the obtainable performances.

After these considerations on the choice criterion for the winding ratio "nx", let's see how system turning off, which represents a not exactly desirable feature of the proposed circuit structure, may be favorably used.

A possible exploitation could regard implementation of supply devices which are protected against accidental overloads or short-circuits or when it that the loading process of a capacitor be stopped at a preset value.

In the latter case, it will suffice to let the "Vocrt" relative to the preset current correspond to the desired end-of-charge voltage.

As to the choice of "IL" and of the saturation threshold of the input limiter, it is stressed that these last two values depend on the voltage and current ranges which are required to the converter.

As already seen, it is possible to work in the BUCK mode both maintaining the reference current and working with higher values. It will be necessary to choice a compromise between the need of having a wide voltage range within which "ILr" is maintained which compels to work with high "ILr/IL" ratios, and that of reducing this parameter and thus limiting the losses. It is at least clear that employment of the input limiter, expressly provided only for the BUCK operation, ensures that the BOOST mode has a certain range of output voltages which are free from turning off.

Although the invention has been described with reference to specific embodiments thereof, it will be clear to those skilled in the art that the described embodiments are subject to numerous amendments and variations within the inventive principle.

For example the above described control logics may be further modified, e.g. by providing a new state, or reset state, in order to ensure, in any working condition, a minimum time for resetting the integrator stage.

Moreover the logics may include one or more auxiliary inputs, through which it will be possible to instantaneously interrupt current supply to the load.

As a further modification, the described current transducer may be integrated with a second shunt in series with the free-wheeling diode with the respective outputs connected to the inputs of a differential amplifier such that, by selecting suitable values for the shunt with reference to the winding ratio of the inductor and/or the amplifying coefficient of the differential structure, this latter will be able to represent the inductor current in any cycle step, including the recover steps.

Therefore it will be evident that the true spirit and protection scope of the invention should not be intended to be limited by the preceding description, but are instead defined in the following claims.

We claim:

1. A high dynamic performance, single stage DC/DC converter system, with time share control means, comprising DC current input means supplying said system with an input current and DC voltage output means providing a DC output voltage, at least one main circuit control loop defining one autonomous circuit system for said DC output voltage and at least one further circuit control loop defining another autonomous circuit system, for a DC output current, said further circuit control loop being internal to said main circuit control loop, said main and said further circuit control loops acting onto said two autonomous circuit systems having a first order transfer function, said time share control means simultaneously and independently controlling a peak value of said input current and said DC output voltage, said converter system further comprising rectifier mean, load impedance means and filter inductance means arranged electrically in series with said rectifier means and said load impedance means, logic control means for simultaneously controlling an actual average current flowing through said inductance means and an instantaneous current flowing through said inductance means, said logic current means having a plurality of inputs and at least one output, and performing respective control operations in two separate time periods, a first one during a conduction phase of some of said rectifier means, when energy is supplied to said filter inductance means, and a second one during a turning off phase of said some of said rectifier means.

2. A converter system according to claim 1, further comprising logic means for controlling current in said inductance means to maintain said current in the neighborhood of a preset valve, so as to ensure an instantaneous response of said system to any input signal having an amplitude lower than preset thresholds, and wherein said conduction phase is proportional to a current required by said load impedance means and does not substantially depend on said output voltage of said system.

3. A system according to claim 1, further comprising analog control mean and wherein rectifier means have switch means and wherein said logic control means include a logic unit for directly controlling said switch means of said rectifier means, said logic unit including control lines and being connected, through a plurality of said control lines, with said analog control means having as inputs a current control signal defining a reference current indicative of an average current value to be supplied to said load impedance means and a signal indicative of said instantaneous current flowing through said filter inductance means, said logic control means further comprising current shunt-type transducer means and amplifier means cascade-coupled therewith, for supplying said signal indicative of said instantaneous current, comparator means for comparing said average current value to be supplied to said load impedance means and an actual average current flowing through said filter inductance means, said comparator means having an output connected to an input of said logic unit, and multiplier means circuit-wise connected to respective limiter means for determining a saturation level of said limiter means, an external current control signal being applied to an input of said limiter means for generating said average current value.

4. A converter system according to claim 3, comprising clock means for timing said logic unit, and integrator means integrating said instantaneous current flowing through said filter inductance means for each cycle of said clock means and generating an actual average current which is constantly compared with an external current control signal.

5. A converter system according to claim 4, comprising reset means for resetting said integrator means.

6. A converter system according to claim 3, comprising clock means for timing said logic unit, and integrator means integrating said instantaneous current flowing through said filter inductance means for each cycle of said clock means and generating an actual average current which is constantly compared with an external current control signal, wherein each cycle of said clock means is divided into a first part during which said actual average current supplied to said load impedance means is controlled and a second part during which said instantaneous current flowing through said filter inductance means is controlled.

7. A converter system according to claim 3, comprising a clock means for timing said logic unit, and integrator means integrating said instantaneous current flowing through said filter inductance means for each cycle of said clock means and generating an actual average current which is constantly compared with an external current control signal, wherein each cycle of said clock means acts on a respective pair of switch means of said rectifier means.

* * * * *